US012038703B2

(12) United States Patent
Wakatsu et al.

(10) Patent No.: US 12,038,703 B2
(45) Date of Patent: Jul. 16, 2024

(54) FIXING UNIT AND IMAGE FORMING APPARATUS

(71) Applicant: CANON KABUSHIKI KAISHA, Tokyo (JP)

(72) Inventors: Kohei Wakatsu, Kanagawa (JP); Kazuhiro Doda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/329,648

(22) Filed: Jun. 6, 2023

(65) Prior Publication Data

US 2023/0314990 A1 Oct. 5, 2023

Related U.S. Application Data

(63) Continuation of application No. 17/686,686, filed on Mar. 4, 2022, now Pat. No. 11,709,446.

(30) Foreign Application Priority Data

Mar. 26, 2021 (JP) ................................ 2021-053218

(51) Int. Cl.
*G03G 15/20* (2006.01)

(52) U.S. Cl.
CPC ................................ *G03G 15/2039* (2013.01)

(58) Field of Classification Search
CPC ................................................ G03G 15/2039
See application file for complete search history.

(56) References Cited

U.S. PATENT DOCUMENTS

| | | | |
|---|---|---|---|
| 10,732,549 B1 | 8/2020 | Furuyama | |
| 11,092,916 B2 | 8/2021 | Yoshida et al. | |
| 11,204,571 B2 | 12/2021 | Wakatsu et al. | |
| 11,221,575 B2 | 1/2022 | Yoshida et al. | |
| 11,281,135 B2 | 3/2022 | Sato et al. | |
| 2015/0037052 A1 * | 2/2015 | Muramatsu | G03G 15/2042 399/334 |
| 2020/0301330 A1 * | 9/2020 | Yoshida | G03G 15/2042 |

FOREIGN PATENT DOCUMENTS

| | | |
|---|---|---|
| JP | 2001100558 A | 4/2001 |
| JP | 2021043245 A | 3/2021 |
| JP | 2021043246 A | 3/2021 |
| JP | 2021043248 A | 3/2021 |

* cited by examiner

*Primary Examiner* — Stephanie E Bloss
*Assistant Examiner* — Michael A Harrison
(74) *Attorney, Agent, or Firm* — Venable LLP

(57) ABSTRACT

A fixing unit includes a tubular film, a pressure roller, a heater including a first heating element and a second heating element, a detector configured to detect a temperature of the heater, a switcher configured to switch which of the first heating element and the second heating element is supplied power from a power supply, and a controller configured to control the switcher. The controller is configured to execute a first control of determining a first electric energy and a second electric energy based on the temperature of the heater detected by the detector and a target temperature of the heater, and a second control of causing the switcher to switch between a state in which power is supplied to the first heating element by the first electric energy and a state in which power is supplied to the second heating element by the second electric energy.

8 Claims, 12 Drawing Sheets

FIXING UNIT AND IMAGE FORMING APPARATUS

BACKGROUND OF THE INVENTION

Field of the Invention

The present invention relates to a fixing unit and an image forming apparatus equipped with a fixing unit.

Description of the Related Art

In a fixing unit, if sheets having a width narrower than a heater width in a longitudinal direction of a heater, i.e., heating apparatus, for heating sheets is subjected to continuous printing, a phenomenon called temperature rise in a non-sheet passing portion occurs in which temperature gradually rises in an area of the heater where the sheet does not pass. If the temperature rise in the non-sheet passing portion becomes significant, fixing members such as a fixing film or a pressure roller of the fixing unit may be damaged by the temperature rise. For example, Japanese Patent Application Laid-Open Publication No. 2001-100558 proposes a configuration in which the temperature rise in the non-sheet passing portion of the fixing unit is reduced by switching a heating ratio between a center portion and end portions in the longitudinal direction of the heater.

According to the system described above, temperature control is performed such that the temperature of the end portions in the longitudinal direction of the fixing unit is maintained within a certain range from the temperature of the center portion in the longitudinal direction, but there are demands for a temperature control with higher accuracy.

SUMMARY OF THE INVENTION

The present invention provides a fixing unit and an image forming apparatus that can perform temperature control of the fixing unit with higher accuracy.

According to one aspect of the invention, a fixing unit includes a tubular film, a pressure roller configured to form a nip portion with the film, the pressure roller being configured to rotate around a rotational axis that extends in a longitudinal direction, a heater configured to heat the film and arranged in an interior space of the film, the heater including a first heating element and a second heating element, the second heating element having a length in the longitudinal direction shorter than the first heating element, a detector configured to detect a temperature of the heater, a switcher configured to switch which of the first heating element and the second heating element is supplied power from a power supply, and a controller configured to control the switcher, the controller being configured to execute a first control of determining a first electric energy and a second electric energy based on the temperature of the heater detected by the detector and a target temperature of the heater, the first electric energy being an electric energy to be supplied per unit period in a case where power is supplied to the first heating element, the second electric energy being an electric energy to be supplied per unit period in a case where power is supplied to the second heating element, and a second control of causing the switcher to switch, during an execution period of a job of forming an image on a recording material, between a state in which power is supplied to the first heating element by the first electric energy and a state in which power is supplied to the second heating element by the second electric energy.

Further features of the present invention will become apparent from the following description of exemplary embodiments with reference to the attached drawings.

DESCRIPTION OF THE EMBODIMENTS

Embodiments will now be described in detail with reference to the drawings. In the following description, passing a recording material through a fixing nip portion of a fixing unit is referred to as passing a sheet, or sheet passing. Further, an area where a heating element generates heat and where the recording material does not pass is called a non-sheet passing area, or non-sheet passing portion, and the area where the recording material passes is called a sheet passing area, or sheet passing portion. Further, a phenomenon in which the temperature of the non-sheet passing area becomes higher than the sheet passing area is called a temperature rise in the non-sheet-passing portion.

First Embodiment

General Configuration of Image Forming Apparatus

Figure 1:
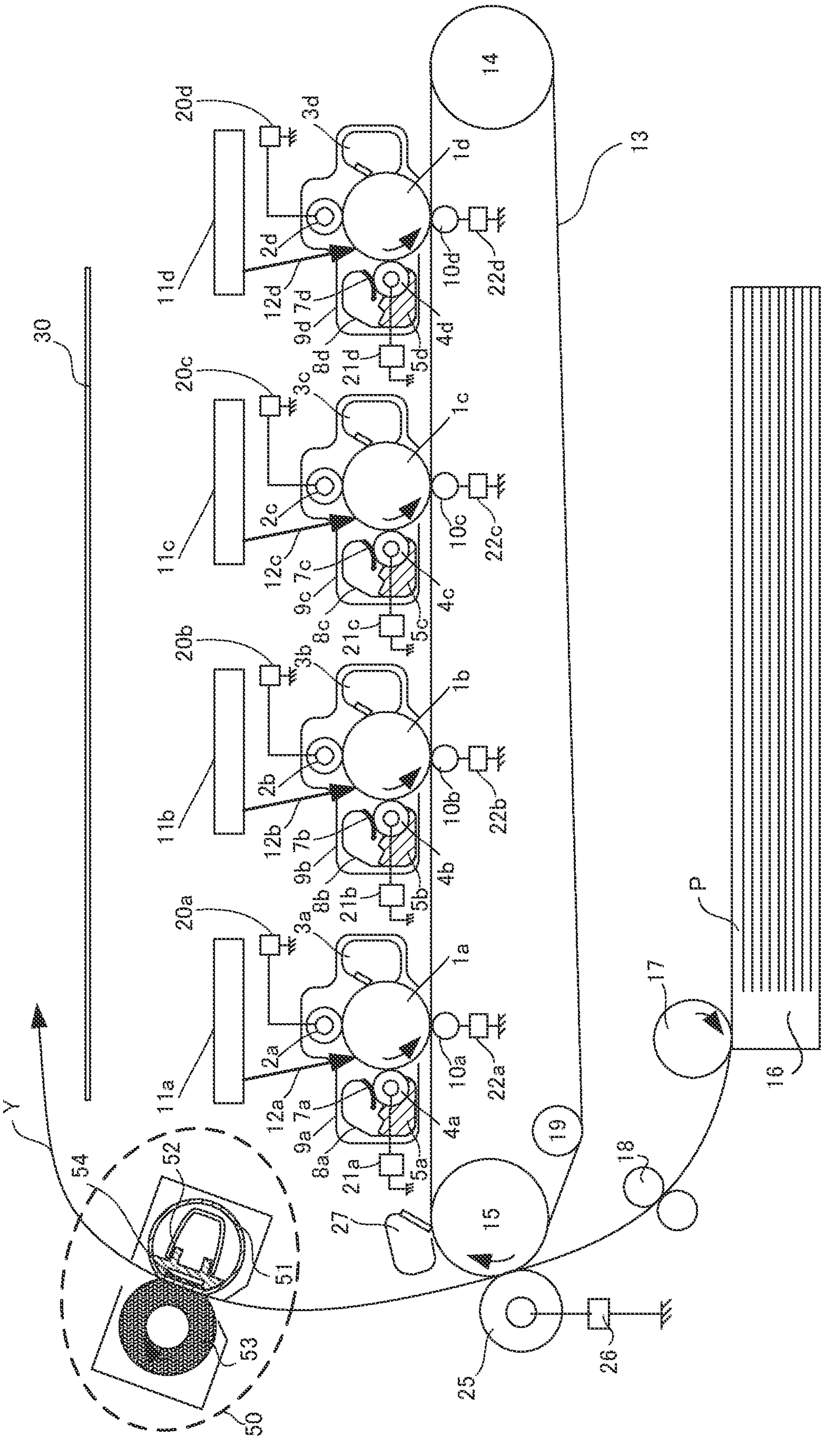
FIG. 1 is a cross-sectional view illustrating a configuration of an image forming apparatus according to first to fourth embodiments.

FIG. 1 is a cross-sectional view illustrating a configuration of a color image forming apparatus adopting an in-line system, which serves as one example of an image forming apparatus equipped with a fixing unit according to the first embodiment. A configuration of an electrophotographic color image forming apparatus will be described with reference to FIG. 1. A first station is a station for forming a yellow (Y) toner image, and a second station is a station for forming a magenta (M) toner image. A third station is a station for forming a cyan (C) toner image, and a fourth station is a station for forming a black (K) toner image.

In the first station, a photosensitive drum 1*a* serving as an image bearing member is an organic photoreceptor (OPC) photosensitive drum. The photosensitive drum 1*a* is formed by laminating multiple layers of functional organic materials including, for example, a carrier generation layer generating charge by exposure and a charge transport layer for transporting generated charge, on a metal cylinder, wherein an outermost layer has a low electrical conductivity and is substantially insulated. A charging roller 2*a* serving as a charging unit abuts against the photosensitive drum 1*a*, and it is driven to rotate along with a rotation of the photosensitive drum 1*a* to uniformly charge a surface of the photosensitive drum 1*a*. ADC voltage or a voltage having superposed a DC voltage and an AC voltage is applied to the charging roller 2*a*, and discharge occurs in a minute air gap, on an upstream side and a downstream side in a direction of rotation of the photosensitive drum 1*a* of a nip portion between the charging roller 2*a* and the surface of the photosensitive drum 1*a*. Thereby, the photosensitive drum 1*a* is charged. A cleaning unit 3*a* is a unit for cleaning toner remaining on the photosensitive drum 1*a* after performing primary transfer described below. A developing unit 8*a* serving as a developing portion accommodates nonmagnetic one-component toner 5*a* and includes a developing roller 4*a* and a developer application blade 7*a*. The photosensitive drum 1*a*, the charging roller 2*a*, the cleaning unit 3*a*, and the developing unit 8*a* are accommodated in an integrated process cartridge 9*a*, i.e., image forming portion, that is detachably attached to the image forming apparatus.

An exposing unit 11*a* serving as an exposure unit is composed of a scanner unit that reflects laser light by a rotary polygon mirror and scans the surface of the photosensitive drum 1*a* or of a light emitting diode (LED) array and irradiates the surface of the photosensitive drum 1*a* with a scanning beam 12*a* modulated based on an image signal. Further, the charging roller 2*a* is connected to a charging high-voltage power supply 20*a* serving as a voltage supply unit for the charging roller 2*a*. The developing roller 4*a* is connected to a developing high-voltage power supply 21*a* serving as a voltage supply unit to the developing roller 4*a*. A primary transfer roller 10*a* is connected to a primary transfer high-voltage power supply 22*a* serving as a voltage supply unit to the primary transfer roller 10*a*. The above description illustrates the configuration of the first station, and the second, third, and fourth stations adopt a similar configuration. The components of the other stations that have the same functions as the first station are denoted with the same reference numbers, and suffix b, c, and d are added to the reference numbers for the respective stations. In the present description, unless a specific station is described, the suffixes a, b, c, and d are omitted.

An intermediate transfer belt 13 is supported by three rollers that serve as stretching members, which are a secondary transfer opposing roller 15, a tension roller 14, and an auxiliary roller 19. A force in a direction tensioning the intermediate transfer belt 13 is applied via a spring (not shown) only to the tension roller 14, so that an appropriate tension force is maintained in the intermediate transfer belt 13. The secondary transfer opposing roller 15 rotates by receiving rotational drive from a main motor 99 (refer to FIG. 2), by which the intermediate transfer belt 13 wound around an outer circumference thereof pivots. The intermediate transfer belt 13 moves at approximately a same speed in an arrow direction (a clockwise direction in FIG. 1, for example) with respect to the photosensitive drums 1*a* to 1*d* (which rotate in a counterclockwise direction in FIG. 1, for example). Further, a primary transfer roller 10 is arranged at a position opposing the photosensitive drum 1 interposing the intermediate transfer belt 13, and it is driven to rotate along with the movement of the intermediate transfer belt 13. A position where the photosensitive drum 1 and the primary transfer roller 10 abut against each other interposing the intermediate transfer belt 13 is referred to as a primary transfer position. The auxiliary roller 19, the tension roller 14, and the secondary transfer opposing roller 15 are electrically grounded. Further, according to the second to fourth stations, the primary transfer rollers 10*b* to 10*d* adopt a similar configuration as the primary transfer roller 10*a*, so that the descriptions thereof are omitted.

Next, an image forming operation according to the image forming apparatus illustrated in FIG. 1 will be described. When a print command is received during standby, the image forming apparatus starts an image forming operation. The photosensitive drum 1 and the intermediate transfer belt 13 start to rotate in the arrow direction in the drawing at a predetermined processing speed by the main motor 99. The photosensitive drum 1*a* is charged uniformly by the charging roller 2*a* to which voltage has been applied from the charging high-voltage power supply 20*a*, and thereafter, an electrostatic latent image is formed based on an image information by a scanning beam 12*a* projected from the exposing unit 11*a*. Toner 5*a* inside the developing unit 8*a* is charged to negative polarity by the developer application blade 7*a* and applied to the developing roller 4*a*. A predetermined developing voltage is applied from the developing high-voltage power supply 21*a* to the developing roller 4*a*. The photosensitive drum 1*a* rotates and the electrostatic latent image formed on the photosensitive drum 1*a* reaches the developing roller 4*a*, toner having a negative polarity is attached to the electrostatic latent image to visualize the image, and toner image of a first color (such as yellow (Y)) is formed on the photosensitive drum 1*a*. The other stations including the process cartridges 9*b* to 9*d* corresponding to other colors, i.e., magenta (M), cyan (C), and black (K), operate similarly. Write signals from a controller (FIG. 2) are delayed according to the timings corresponding to the distances between the primary transfer positions of each of the colors, the electrostatic latent images formed by scanning beams 12 from exposing units 11 are formed on each of the photosensitive drums 1*a* to 1*d*. ADC high voltage having an opposite polarity as toner is applied to each of the primary transfer rollers 10*a* to 10*d*. Thereby, the toner images on the photosensitive drums 1*a* to 1*d* are sequentially transferred to the intermediate transfer belt 13 (hereinafter referred to as primary transfer), and a multilayer toner image is formed on the intermediate transfer belt 13.

Thereafter, at a matched timing with the creation of the toner image, a sheet P serving as a recording material supported on a cassette 16, i.e., sheet feeder, is fed, or picked up, by a sheet feed roller 17 rotated under drive control with a sheet feed solenoid (not shown). The sheet P being fed is conveyed by a conveyance roller (not shown) to a registration roller 18. Various sheet materials of different sizes and materials can be used as a sheet P serving as a recording material, such as normal paper and thick paper, plastic films, cloths, sheet materials subjected to surface treatments such as coated paper, and sheet materials having special shapes such as envelopes and index paper. The sheet P is conveyed to a transfer nip portion, which is a contact portion between the intermediate transfer belt 13 and a secondary transfer roller 25, by the registration roller 18 in synchronization with the toner image on the intermediate transfer belt 13. A voltage having an opposite polarity as toner is applied to the secondary transfer roller 25 from a secondary transfer high-voltage power supply 26, and a multilayer toner image of four colors borne on the intermediate transfer belt 13 is transferred collectively onto the sheet P, that is, on the recording material (hereinafter referred to as secondary transfer). Meanwhile, toner remaining on the intermediate transfer belt 13 after the secondary transfer is cleaned by a cleaning unit 27. The sheet P to which secondary transfer has been completed is conveyed to a fixing unit 50 serving as a fixing unit, and the sheet P to which the toner image has been fixed is discharged onto a sheet discharge tray 30 as a product having an image printed or copied thereto. A fixing film 51, a nip forming member 52, a pressure roller 53, and a heater 54 of the fixing unit 50 are described below.

Control Block Diagram of Image Forming Apparatus

Figure 2:
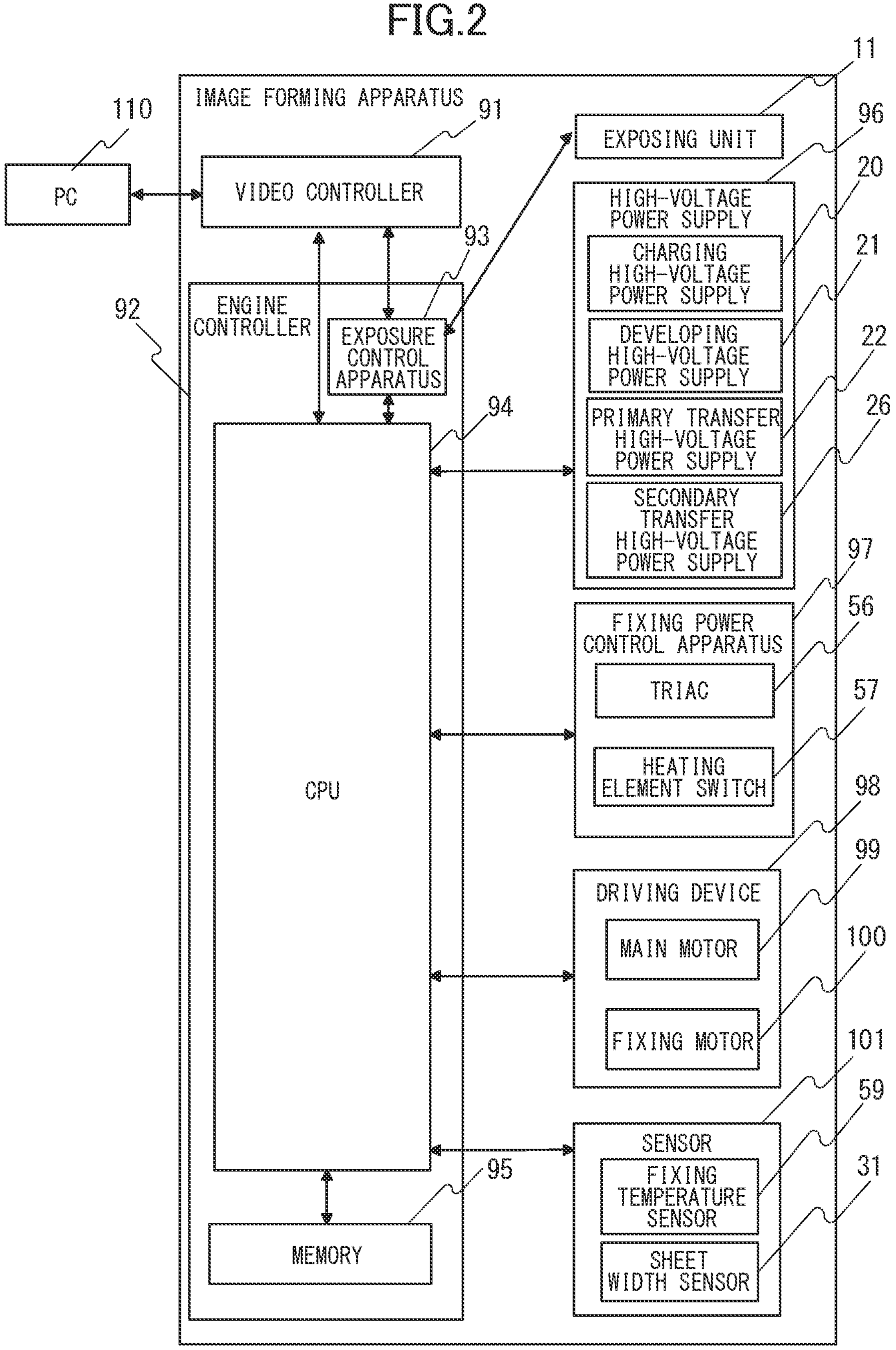
FIG. 2 is a block diagram illustrating a configuration of a controller of the image forming apparatus according to the first to fourth embodiments.

FIG. 2 is a block diagram illustrating a configuration of a controller of the image forming apparatus, and a printing operation of the image forming apparatus will be described with reference to this drawing. A PC 110 serving as a host computer transmits a print command containing image data and print information of a print image to a video controller 91 provided inside the image forming apparatus.

The video controller 91 converts the image data received from the PC 110 to exposure data, transfers the exposure data to an exposure control apparatus 93 within an engine controller 92, and transmits a print command to a CPU 94. The exposure control apparatus 93 is controlled by the CPU 94 and controls the exposing unit 11 that turns the laser light on and off based on the exposure data. The CPU 94 serving as a controller starts an image forming operation when a print command is received from the video controller 91.

The CPU 94 and a memory 95 is installed to the engine controller 92. The CPU 94 operates according to a program stored in advance in the memory 95. The memory 95 is an example of a non-transitory computer-readable storage medium storing control programs for having the fixing unit and the image forming apparatus execute predetermined operations. Further, the CPU 94 includes a timer for measuring time, and the memory 95 stores various information for controlling the fixing unit 50 described below. A high-voltage power supply 96 is composed of the charging high-voltage power supply 20, the developing high-voltage power supply 21, the primary transfer high-voltage power supply 22, and the secondary transfer high-voltage power supply 26 described above. Further, a fixing power control apparatus 97 includes a bidirectional thyristor (hereinafter referred to as triac) 56 serving as a supply controller, and a heating element switch 57 (refer to FIG. 6) serving as a switcher for exclusively selecting a heating element to which power is supplied. The heating element switch 57 is an example of a switcher for switching which of the first heating element and the second heating element is supplied power from the power supply. The fixing power control apparatus 97 selects the heating element to which power is suppled and determines the electric energy to be supplied at the fixing unit 50.

A driving device 98 includes a main motor 99 and a fixing motor 100. Further, a sensor 101 includes a fixing temperature sensor 59 which is a detector, i.e., temperature detection unit, for detecting temperature of the fixing unit 50, and a sheet width sensor 31 for detecting a width of the sheet P, wherein a detection result of the sensor 101 is transmitted to the CPU 94. The CPU 94 acquires a detection result of the sensor 101, and based on the detection result, controls the exposing unit 11, the high-voltage power supply 96, the fixing power control apparatus 97, and the driving device 98. Thereby, the CPU 94 forms the electrostatic latent image, transfers the developed toner image to the sheet P, fixes the transferred toner image to the sheet P, and performs control of an image forming process in which the image data received from the PC 110 is printed as toner image on the sheet P The image forming apparatus according to the present disclosure is not limited to the image forming apparatus having the configuration illustrated in FIG. 1, and it can be any image forming apparatus equipped with the fixing unit 50 having the heater 54 described below and capable of printing images on sheets P having different widths.

Configuration of Fixing Unit

Next, a configuration of the fixing unit 50 for controlling a heating apparatus, i.e., heater, for heating the toner image on the sheet P by the heating element will be described with reference to FIG. 3. In the description, a "longitudinal direction" refers to a rotational axis direction of the pressure roller 53 that is approximately orthogonal to a conveyance direction of the sheet P described below. Further, a length of the sheet Pin a direction approximately orthogonal to the conveyance direction of the sheet P, i.e., longitudinal direction, is called a sheet width.

Figure 3:
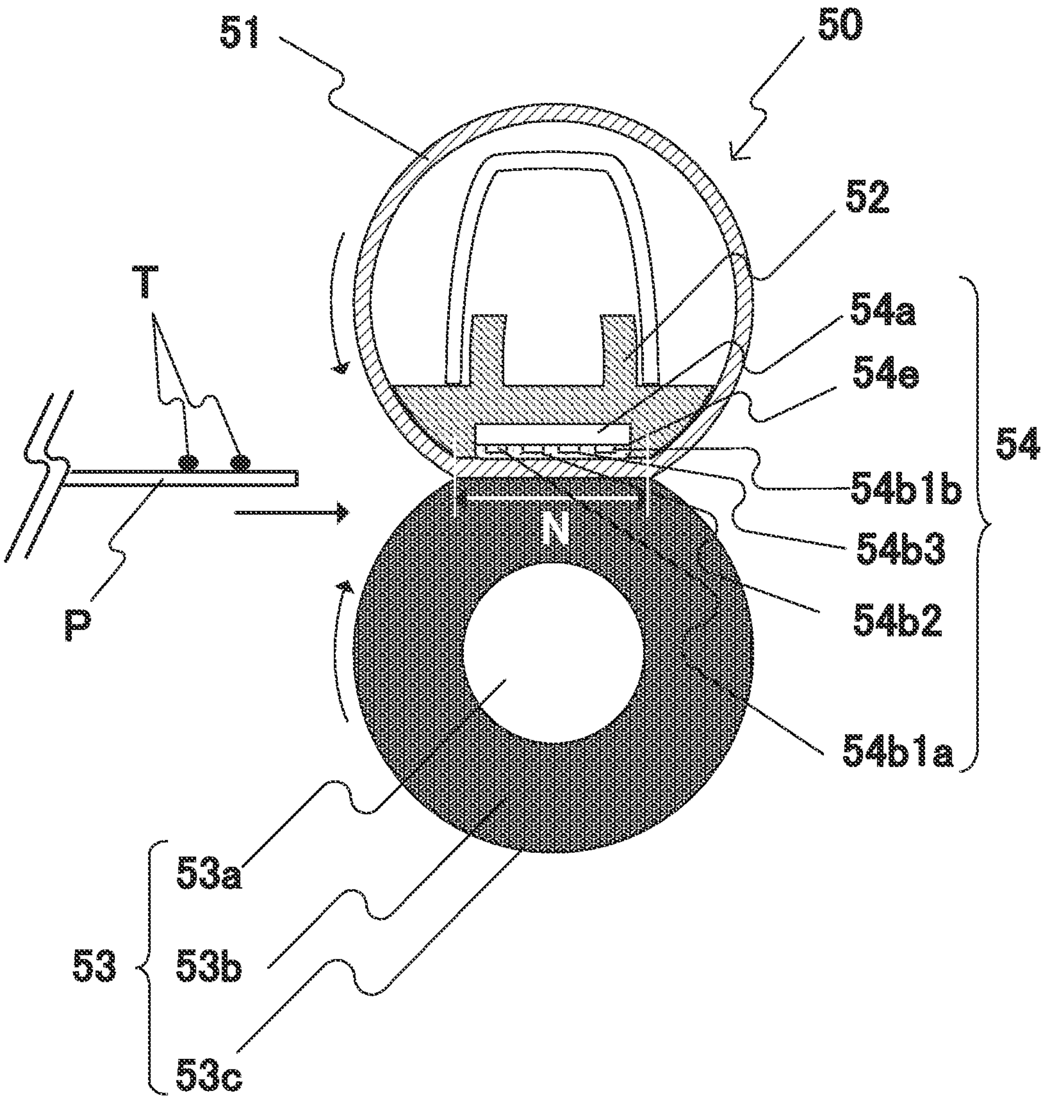
FIG. 3 is a schematic cross-sectional view illustrating a configuration of a fixing unit according to the first to fourth embodiments.

FIG. 3 is a schematic cross-sectional view illustrating a configuration of the fixing unit 50. In the fixing unit 50, the sheet P bearing an unfixed toner image T is conveyed from a left side in the drawing in an arrow direction in the drawing toward a fixing nip portion N configured by having the fixing film 51 (hereinafter referred to as the film 51) abut against the pressure roller 53. In the fixing nip portion N, the fixing film 51 is nipped by the pressure roller 53 and a heater 40. By heating the sheet P while conveying the sheet P from the left side toward the right side of the drawing in the fixing nip portion N, the toner image T is fixed to the sheet P The fixing unit 50 is configured of the film 51 having a tubular shape, the nip forming member 52 that holds the film 51, the pressure roller 53 that forms the fixing nip portion N together with the film 51, and the heater 54, i.e., heater unit, serving as a heating apparatus that heats the sheet P The film 51 is a fixing film that serves as a heating rotary member. The film 51 has polyimide as a base layer, and on the base layer are formed an elastic layer formed of silicone rubber and a release layer formed of perfluoroalkoxy alkane (PFA). Grease is applied to an inner surface of the film 51 so as to reduce a frictional force generated between the nip forming member 52 and the heater 54 and the film 51 when the film 51 is rotated.

The nip forming member 52 guides the film 51 from the inner side and forms the fixing nip portion N between the film 51 and the pressure roller 53. The nip forming member 52 is a member having stiffness, heat-resisting property, and heat-insulating property, and is formed of a liquid crystal polymer, for example. The film 51 is fit to the exterior of the nip forming member 52. The pressure roller 53 is a roller that serves as a pressure rotary member, and is composed of a core metal 53*a*, an elastic layer 53*b*, and a release layer 53*c*. The pressure roller 53 has both end portions in the longitudinal direction supported rotatably and is driven to rotate by the fixing motor 100 (FIG. 2), and the film 51 is driven to rotate by the rotation of the pressure roller 53. The heater 54 serving as a heating member is arranged in an interior space of the fixing film 51, supported by the nip forming member 52, and in contact with an inner side of the film 51. The details of the heater 54 will be described below. The nip forming member 52, i.e., heater holder, and the heater 54 are arranged in the interior space of the film 51 and constitute a nip forming unit that forms the fixing nip portion N between the nip forming member 52 and the pressure rotary member.

General Configuration of Heater Unit

Figure 4:
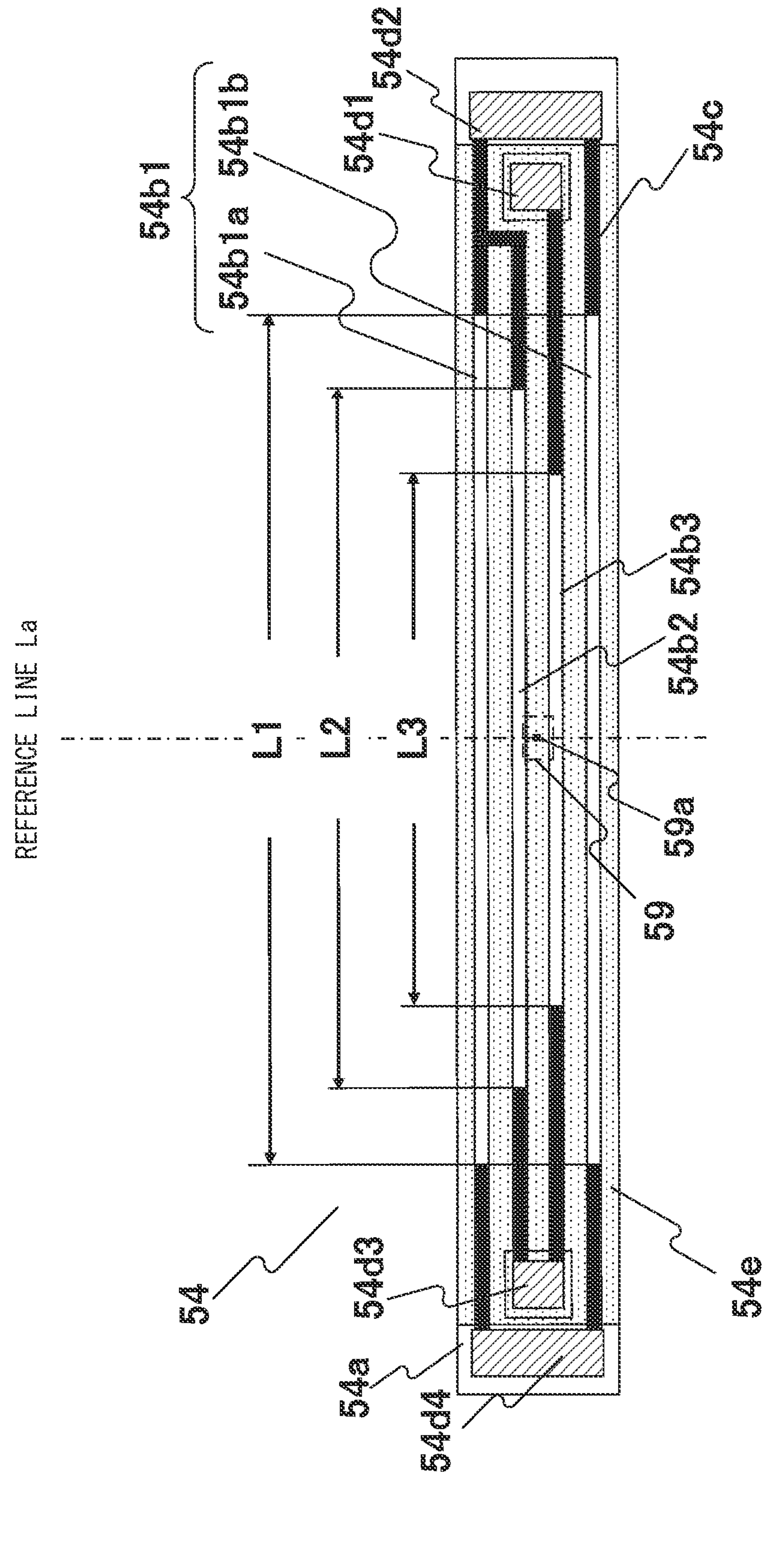
FIG. 4 is a schematic diagram illustrating a configuration of a heater according to the first to fourth embodiments.

Next, the heater 54 serving as a heating unit will be described. FIG. 4 is a schematic diagram illustrating a configuration of the heater 54 when the heater 54 in which the heating element is arranged is viewed from a side of the pressure roller 53 illustrated in FIG. 3. In FIG. 4, a reference line La is a center line or center position in a longitudinal direction of heating elements 54*b*1*a*, 54*b*1*b*, 54*b*2, and 54*b*3, and it is also a center line in the longitudinal direction, i.e., sheet width direction, of the sheet P conveyed to the fixing nip portion N of the fixing unit 50. As illustrated in FIG. 4, the heater 54 includes a substrate 54*a*, the heating elements 54*b*1*a*, 54*b*1*b*, 54*b*2, and 54*b*3, a conductor 54*c*, contacts 54*d*1 to 54*d*4, and a protective glass layer 54*e*. The conductor 54*c* is the portion painted in black in the drawing. Alumina ($Al_2O_3$) which is a ceramic material is used as the substrate 54*a* according to the present embodiment. Alumina ($Al_2O_3$), aluminum nitride (AlN), zirconia ($ZrO_2$), and silicon carbide (SiC) are known as ceramic substrate materials, and among these materials, alumina ($Al_2O_3$) is inexpensive and easily obtained. Alternatively, metal having a superior strength can be used as the substrate 54*a*. When a metal substrate is used, stainless steel is advantageous from the viewpoint of both cost and strength, and it is suitably used. In both the ceramic substrate and the metal substrate, if the substrate has conductivity, an insulating layer can be provided for use. The heating elements 54*b*1*a*, 54*b*1*b*, 54*b*2, and 54*b*3, the conductor 54*c*, and the contacts 54*d*1 to 54*d*4 are arranged on the substrate 54*a*, and the protective glass layer 54*e* serving as an insulating layer is coated thereon to ensure insulation between the respective heating elements and the film 51.

Each of the heating elements have different lengths in the longitudinal direction (right-left direction lengths in FIG. 4), wherein a longitudinal length L1 of the heating elements 54*b*1*a* and 54*b*1*b* is 222 mm, a longitudinal length L2 of the heating element 54*b*2 is 188 mm, and a longitudinal length L3 of the heating element 54*b*3 is 154 mm. Magnitude correlation of the longitudinal lengths L1, L2, and L3 is L1>L2>L3. For example, if the sheet P of A4 size or letter size, i.e., first size, is used, the heating elements 54*b*1*a* and 54*b*1*b* are used. If the sheet P of B5 size, i.e., second size having a shorter longitudinal width than the first size, is used, the heating element 54*b*2 is mainly used. If the sheet P of A5 size, i.e., third size having a shorter longitudinal width than the second size, is used, the heating element 54*b*3 is mainly used. The B5 size sheet has a short side, i.e., longitudinal width, of 182 mm and a long side of 257 mm. The respective heating elements are arranged in the named order of heating elements 54*b*1*a*, 54*b*2, 54*b*3, and 54*b*1*b*, in the short direction, that is, up-down direction in FIG. 4.

As illustrated in FIG. 4, the heating elements 54*b*1*a* and 54*b*1*b* have their respective first ends electrically connected to a contact 54*d*2, i.e., first contact, and their second ends electrically connected to a contact 54*d*4, i.e., fourth contact, via the conductor 54*c*. Further, the heating element 54*b*2 has its first end electrically connected to a contact 54*d*2 and its second end electrically connected to a contact 54*d*3, i.e., third contact, via the conductor 54*c*. Similarly, the heating element 54*b*3 has its first end electrically connected to a contact 54*d*1, i.e., second contact, and its second end electrically connected to the contact 54*d*3 via the conductor 54*c*. As illustrated in FIG. 4, the longitudinal lengths of the heating element 54*b*1*a* and the heating element 54*b*1*b* are the same length L1, and the two heating elements 54*b*1*a* and 54*b*1*b* are always used simultaneously. In the following description, the pair of heating elements 54*b*1*a* and 54*b*1*b* is collectively referred to as a heating element 54*b*1, i.e., first heating element. Further, as for resistance values of the heating elements, the heating element 54*b*1 has a resistance value of 10.7Ω, i.e., combined resistance values of heating elements 54*b*1*a* and 54*b*1*b*, the heating element 54*b*2, i.e., third heating element, has a resistance value of 24.1Ω, and the heating element 54*b*3, i.e., second heating element, has a resistance value of 24.1Ω.

In FIG. 4, the part enclosed by a broken line is the fixing temperature sensor 59. The broken line shows that the fixing temperature sensor 59 is arranged on a back side of the substrate 54*a*, that is, the opposite side from the side on which the heating elements 54*b*1, 54*b*2, and 54*b*3 are arranged, and also indicates the position where the fixing temperature sensor 59 abuts against the substrate 54*a*. A thermistor 59*a* that detects the temperature of the fixing temperature sensor 59 is arranged on a center line in the longitudinal direction of the heating elements 54*b*1, 54*b*2, and 54*b*3 and also on the reference line La which is the center line of the sheet P being conveyed to the fixing unit 50.

Configuration of Heater Unit

Figure 5:
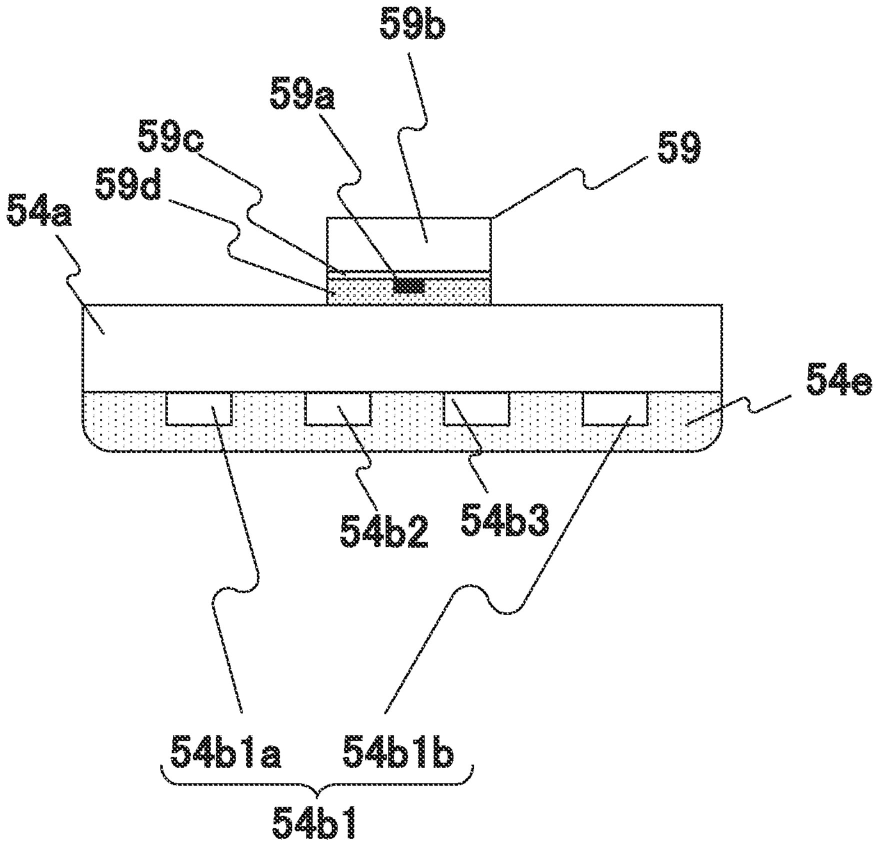
FIG. 5 is a schematic diagram illustrating a cross section of the heater according to the first to fourth embodiments.

FIG. 5 is a schematic diagram of the cross section of the heater 54 that illustrates a cross section of the heater 54 cut at a center line, i.e., the reference line La of FIG. 4, in the longitudinal direction of the sheet P, being conveyed to the fixing unit 50. The fixing temperature sensor 59 serving as a detector, i.e., temperature detection unit, for detecting the temperature of the heater 54 is composed of the following members. That is, the fixing temperature sensor 59 is composed of a thermistor 59*a*, a holder 59*b*, a ceramic paper 59*c* that blocks thermal conduction between the holder 59*b* and the thermistor 59*a*, and an insulating resin sheet 59*d* that protects the thermistor 59*a* physically and electrically. The thermistor 59*a* is a temperature detecting element whose resistance value changes in response to the temperature of the heater 54, by which a voltage output therefrom changes, which is connected to the CPU 94 via a Dumet wire (not shown) and a wiring, and outputs a voltage corresponding to the temperature of the heater 54 to the CPU 94. The CPU 94 performs temperature control of the heater 54 based on a temperature detection result of the fixing temperature sensor 59, i.e., the thermistor 59*a*. The fixing temperature sensor 59 is arranged on a side opposite from the side of the substrate 54*a* on which the heating elements 54*b*1, 54*b*2, and 54*b*3 are arranged and covered by the protective glass layer 54*e*, and it is in contact with the substrate 54*a*.

Power Control Circuit

Figure 6:
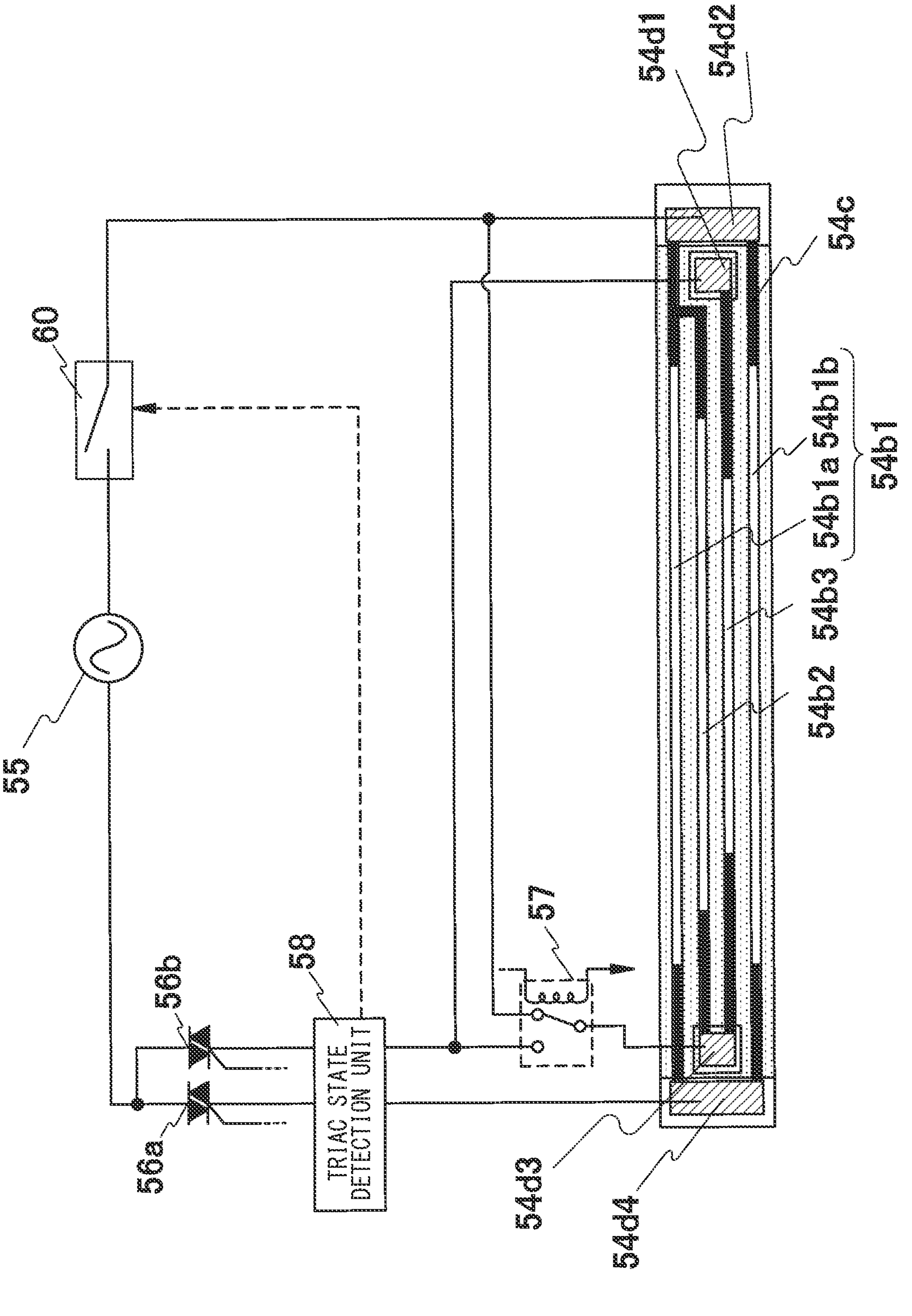
FIG. 6 is a schematic diagram illustrating a configuration of a power control circuit of the fixing unit according to the first to fourth embodiments.

FIG. 6 is a schematic diagram illustrating a configuration of a power control circuit of the fixing unit 50. The fixing unit 50 according to the present embodiment forms a desirable temperature distribution in a longitudinal direction of the heater 54 by switching the heating element to which power is supplied in accordance with the size of the sheet P.

The power control circuit of the fixing unit 50 includes triacs 56*a* and 56*b* which are switching parts for connecting or disconnecting a power supply path, the heating element switch 57, a triac state detection unit 58, and a relay 60, i.e., second relay, for blocking power supply to all heating elements. The triacs 56*a* and 56*b* perform connecting or disconnecting of the power supply paths from an AC power supply 55 to each of the heating elements 54*b*1, 54*b*2, and 54*b*3. In the present embodiment, the heating element switch 57 is composed of a change-over contact relay (hereinafter referred to as a relay 57). Further, the triac state detection unit 58 monitors on and off states of the triacs 56*a* and 56*b*.

The triac 56*a*, i.e., first switch, connects or disconnects, i.e., turns on or off, the power supply path between the AC power supply 55 and the contact 54*d*4 of the heater 54. Meanwhile, the triac 56*b*, i.e., second switch, connects or disconnects, i.e., turns on or off, the power supply path between the AC power supply 55 and the contact 54*d*3 of the heater 54 via the relay 57, or between the AC power supply 55 and the contact 54*d*1 of the heater 54. The relay 57, i.e., first relay, can switch the contact 54*d*3 of the heater 54 to be connected to the triac 56*b* or to the AC power supply 55.

For example, when supplying power from the AC power supply 55 to the heating element 54*b*1, the triac 56*a* is turned on to connect the AC power supply 55 and the contact 54*d*4 of the heater 54, and the triac 56*b* is turned off. Thereby, the heating element 54*b*1 (54*b*1*a* and 54*b*1*b*) is connected to the AC power supply 55 via the contacts 54*d*2 and 54*d*4 of the heater 54. Further, when supplying power from the AC power supply 55 to the heating element 54*b*2, the triac 56*b* is turned on to connect the AC power supply 55 and the relay 57, the relay 57 is controlled to connect the contact 54*d*3 of the heater 54 to the triac 56*b*, and the triac 56*a* is turned off. Thereby, the first end of the heating element 54*b*2 is connected via the contact 54*d*3 of the heater 54, the relay 57, and the triac 56*b* to the AC power supply 55, and the second end of the heating element 54*b*2 is connected via the contact 54*d*2 of the heater 54 to the AC power supply 55.

Further, when supplying power from the AC power supply 55 to the heating element 54*b*3, the triac 56*b* is turned on and the relay 57 is controlled to connect the contact 54*d*3 of the heater 54 to the AC power supply 55, and the triac 56*a* is turned off. Thereby, the first end of the heating element 54*b*3 is connected via the contact 54*d*3 of the heater 54 and the relay 57 to the AC power supply 55, and the second end of the heating element 54*b*3 is connected via the contact 54*d*1 of the heater 54 and the triac 56*b* to the AC power supply 55. The turning on and off of the triacs 56*a* and 56*b* is performed based on a command, i.e., control signal, from the CPU 94.

The triac state detection unit 58 detects the on and off states of the triacs 56*a* and 56*b*. For example, in a state where the triacs 56*a* and 56*b* are turned on simultaneously due to an unexpected failure of the CPU 94, for example, the triac state detection unit 58 sets the relay 60 to an off state, and forcibly blocks the power supply from the AC power supply 55 to the fixing unit 50, i.e., the heater 54. Thereby, it is ensured that only one of the triacs 56*a* and 56*b* is turned on, or both are turned off, so that the failure of the fixing unit 50 can be prevented.

As described, the triacs 56*a* and 56*b*, the triac state detection unit 58, and the relay 57 operate as a switcher that switches connection of the power supply path such that power from the AC power supply 55 is only supplied to one of the heating elements among the three heating elements 54*b*1, 54*b*2, and 54*b*3. In the present embodiment, a switcher adopting such a configuration is utilized, but any configuration capable of enabling power to be supplied to only one of the heating elements can be adopted, and the configuration for controlling the power supply path is not limited to the above-described configuration.

Further, a switching period of the switcher, that is, a transition period during which power supply is not performed to any of the heating elements, is preferably as short as possible. The reason is that if the switching period of the heating element during printing of the sheet P is long, unintended lowering of temperature of the heater 54 may occur, which may lead to insufficient melting of toner on the sheet P. In the present embodiment, a system of switching the on and off states of the triac 56*a* and the triac 56*b* is adopted to switch heating elements during printing of the sheet P. Therefore, in the present embodiment, the time required to switch and on and off states of the triac 56*a* and the triac 56*b* is extremely short. Thereby, power can be supplied via the triac 56*a* during a half-wave period of voltage waveform of the AC power supply 55, i.e., half-cycle of the power supply frequency, and then power can be supplied via the triac 56*b* during the next half-wave period, or half-cycle. Meanwhile, if the relay 57 is used for switching of heating elements during printing, it is difficult to shorten the switching time of heating elements. The reason is that it not only takes time in the order of 100 msec to switch the relay 57 but also requires a certain period for preventing contact sticking that may occur by flowing of current during switching of the relay 57. An experiment of intentionally elongating the switching time of the relay 57 was performed, according to which insufficient melting of toner on the sheet P tended to occur when the switching time of the relay 57 exceeded 320 msec. Therefore, even in a case where the relay 57 is used for the switching of heating elements during printing of the sheet P, it is preferable to set the switching time of the relay 57 to 320 msec or shorter.

First Power Control

In the present embodiment, a "first power control" performed to approximate a temperature of the heater 54 detected by the fixing temperature sensor 59 to a target temperature and a "second power control" performed to approximate a distribution of electric energy to a plurality of heating elements to a target electric energy are performed simultaneously. At first, the first power control will be described. In the first power control, the electric energy supplied to the heating element is calculated based on a difference between target temperature of the heater 54 and a temperature detected by the fixing temperature sensor 59 at a fixed cycle. Specifically, the CPU 94 calculates the electric energy necessary for the temperature of the heater 54 to reach the target temperature suitable for forming an image to the sheet P based on temperature information of the heater 54 detected by the thermistor 59*a* serving as a detector, i.e., temperature detection unit, at a fixed cycle. In the present embodiment, power supply to the heating element is performed by phase control of the AC power supply 55.

In the present embodiment, proportional-integral control (PI control) is used to calculate electric energy, and power calculation by PI control is performed periodically, with an integer multiple of a half cycle of voltage waveform of the AC power supply 55 set as one periodic unit. Specifically, the periodic unit is two half waves, i.e., one cycle, of power supply frequency. In PI control, the CPU 94 compares the detection temperature of the heater 54 by the thermistor 59*a* and the target temperature per periodic unit, and based on the magnitude of difference between two temperatures, the values of a proportional term and an integral term in PI control are determined. The proportional term is a value that is proportional to the magnitude of difference of temperature, and the integral term is a value corresponding to an integrated value of the temperature difference. The CPU 94 determines the electric energy to be supplied to the heating element based on the values of the proportional term and the integral term. In the present embodiment, the values of the proportional term and the integral term are set in advance in correspondence with the magnitude of difference of temperature for each heating element, and the calculation of PI control serving as a first power control is performed using the values of the proportional term and the integral term of the heating element being selected. In the following description, an example where the heating elements **54*b*1 and 54*b*3** are used as heating elements to which power is supplied when performing printing to an A5-size sheet P will be described.

Specifically, the PI control according to the present embodiment will be described. A timing (cycle) number for performing PI control is referred to as n, the proportional term corresponding to the timing number is referred to as $P_n$ (unit: %), and the integral term corresponding to the timing number is referred to as $I_n$ (unit: %). A power duty $D_n$ (unit: %) supplied to the heating element based on PI control is represented by the following expressions 1 to 3.

$$D_n = P_n + I_n \text{ (when } 100\% \geq P_n + I_n \geq 0\%) \quad \text{Expression 1}$$

$$D_n = 100 \text{ (when } P_n + I_n > 100\%) \quad \text{Expression 2}$$

$$D_n = 0 \text{ (when } 0\% > P_n + I_n) \quad \text{Expression 3}$$

In the expression, the power duty $D_n$ represents a ratio of supply of electric energy determined based on how much power supply is performed with respect to the AC voltage waveform of the AC power supply 55. The power duty $D_n$ can take a value from 0% to 100% depending on a power supply pattern determined by phase control. Based on Expression 2, in a case where the value obtained by adding the proportional term $P_n$ and the integral term $I_n$ is greater than 100%, the power duty $D_n$ is set to 100%. Meanwhile, based on Expression 3, in a case where the value obtained by adding the proportional term $P_n$ and the integral term $I_n$ is a negative value smaller than 0%, the power duty $D_n$ is set to 0%. The power supply pattern to heating elements by phase control is stored in advance in the memory 95 serving as a storage unit. The CPU 94 selects a corresponding power supply pattern from the memory 95 according to the power duty $D_n$ and performs power supply to the heating element in accordance with the selected power supply pattern.

When printing to the sheet P is started, at first, an initial value $I_0$ of an output value of an integral term I operated by integral control is determined. Table 1 is a table showing the initial value $I_0$ (unit: %) of the integral term I of the heating elements **54*b*1 and 54*b*3. As illustrated in Table 1, the initial value $I_0$ of the heating element 54*b*1 is 32.5% and the initial value $I_0$ of the heating element 54*b*3** is 50%. Ratio $I_0P$ will be described below.

TABLE 1

| $I_0$ [%] | | |
|---|---|---|
| HEATING ELEMENT 54b1 | HEATING ELEMENT 54b3 | RATIO $I_0P$ |
| 32.5 | 50 | 1.02 |

Temperature detection of the heater 54 by the thermistor **59*a* is performed every two half-wave cycle of the voltage waveform, i.e., one cycle of the power supply frequency, and a difference ΔT between the target temperature of the heater 54 and the temperature detected by the thermistor 59*a*, i.e., value obtained by subtracting the detection temperature of the thermistor 59*a* from the target temperature, is calculated. Table 2 is a table showing values of proportional terms Pn (unit: %) of the heating elements 54*b*1 and 54*b*3 corresponding to the differences ΔT (unit: ° C.) being calculated. Table 2 shows the values of the proportional terms Pn of the heating elements 54*b*1 and 54*b*3 corresponding to every 1° C. change of difference ΔT within the range of −15° C. to 15° C. of difference ΔT. For example, in a case where the difference ΔT between the two temperatures is −10° C., the proportional term Pn of the heating element 54*b*1 is −27.5% and the proportional term Pn of the heating element 54*b*3 is −42.5%. Similarly, in a case where the difference ΔT between the two temperatures is 5° C., the proportional term Pn of the heating element 54*b*1 is 15% and the proportional term Pn of the heating element 54*b*3** is 22.5%. The ratio PP will be described below

TABLE 2

| | $P_n$ [%] | | |
|---|---|---|---|
| DIFFERENCE ΔT [° C.] | HEATING ELEMENT 54b1 | HEATING ELEMENT 54b3 | RATIO PP |
| −15 | −40 | −60 | 1.04 |
| −14 | −37.5 | −57.5 | 1.02 |
| −13 | −35 | −52.5 | 1.04 |
| −12 | −32.5 | −50 | 1.02 |
| −11 | −30 | −45 | 1.04 |
| −10 | −27.5 | −42.5 | 1.01 |
| −9 | −25 | −37.5 | 1.04 |
| −8 | −22.5 | −35 | 1.00 |
| −7 | −20 | −30 | 1.04 |
| −6 | −17.5 | −25 | 1.09 |
| −5 | −15 | −22.5 | 1.04 |
| −4 | −12.5 | −17.5 | 1.12 |
| −3 | −10 | −15 | 1.04 |
| −2 | −7.5 | −10 | 1.17 |
| −1 | 0 | 0 | — |
| 0 | 0 | 0 | — |
| 1 | 0 | 0 | — |
| 2 | 7.5 | 10 | 1.17 |
| 3 | 10 | 15 | 1.04 |
| 4 | 12.5 | 17.5 | 1.12 |
| 5 | 15 | 22.5 | 1.04 |
| 6 | 17.5 | 25 | 1.09 |
| 7 | 20 | 30 | 1.04 |
| 8 | 22.5 | 35 | 1.00 |
| 9 | 25 | 37.5 | 1.04 |
| 10 | 27.5 | 42.5 | 1.01 |
| 11 | 30 | 45 | 1.04 |
| 12 | 32.5 | 50 | 1.02 |
| 13 | 35 | 52.5 | 1.04 |
| 14 | 37.5 | 57.5 | 1.02 |
| 15 | 40 | 60 | 1.04 |

Further, the CPU 94 stores an integrated value ΔTv having integrated the difference ΔT of the temperature calculated by the two half-wave cycle in the memory 95. The CPU 94 calculates an integral term $I_n$ using the following Expression 4.

$$I_n = I_{n-1} + \Delta I \quad \text{Expression 4}$$

For example, integral term $I_1$ is calculated based on $I_1 = I_0 + \Delta I$ using the initial value $I_0$ of the integral term $I_n$ mentioned above. Further, the value of ΔI is varied depending on an integrated value $\Delta T_v$ having integrated the difference ΔT. Table 3 is a table showing the values of ΔI of the heating elements **54*b*1 and 54*b*3 corresponding to the integrated value $\Delta T_v$ (unit: ° C.). As shown in Table 3, in a case where the value of integrated value $\Delta T_v$ is −400 or more and less than 400, the values of ΔI of the heating elements 54*b*1 and 54*b*3 is 0%. Meanwhile, in a case where the value of integrated value ΔT, is 400 or more, the value of ΔI of the heating element 54*b*1 is 5% and the value of ΔI of the heating element 54*b*3 is 10%. In a case where the value of integrated value $\Delta T_v$ is less than −400, the value of ΔI of the heating element 54*b*1 is −5% and the value of ΔI of the heating element 54*b*3** is −10%.

TABLE 3

| INTEGRATED VALUE $\Delta T_v$ [° C.] | ΔI [%] HEATING ELEMENT 54b1 | ΔI [%] HEATING ELEMENT 54b3 |
|---|---|---|
| 400 OR MORE | 5 | 10 |
| −400 OR MORE, LESS THAN 400 | 0 | 0 |
| LESS THAN −400 | −5 | −10 |

As mentioned above, the values of the proportional term $P_n$ and the integral term $I_n$ of each heating element are determined, and based on the determined values of the proportional term P. and the integral term $I_n$, a power duty $D_n$ is determined, and power corresponding to the determined power duty $D_n$ is supplied to the corresponding heating element. In the present embodiment, the above-mentioned determination of power duty $D_n$ is performed by a two half-wave cycle, and the power based on the determined power duty $D_n$ is supplied during the next two half-wave cycle. Further, the power corresponding to the power duty $D_n$ is supplied to the heating element selected by the above-mentioned switcher. In the present embodiment, the timing of switching the heating element to which power is supplied corresponds to the update timing of PI control, that is, to the timing of update of the power duty $D_n$.

Example of Power Supply Control to Heating Element

Next, control of power supply to heating elements during actual printing of the sheet P will be explained. Table 4 is a table illustrating how the electric energy to be supplied to the heating elements is determined according to elapsed time during printing to the sheet P

TABLE 4

| TIMING n | | . . . | 1 | 2 | 3 | 4 | 5 | 6 | 7 | 8 |
|---|---|---|---|---|---|---|---|---|---|---|
| TIME (s) | | . . . | 0.000 | 0.020 | 0.040 | 0.060 | 0.080 | 0.100 | 0.120 | 0.140 |
| TARGET TEMPERATURE (° C.) | | . . . | 220 | 220 | 220 | 220 | 220 | 220 | 220 | 220 |
| THERMISTOR DETECTION VALUE (° C.) | | . . . | 215 | 216 | 216 | 216 | 217 | 217 | 217 | 217 |
| ΔT (° C.) | | . . . | 5 | 4 | 4 | 4 | 3 | 3 | 3 | 3 |
| ΔTv (° C.) | | . . . | 380 | 384 | 388 | 392 | 395 | 398 | 401 = 1 | 4 |
| SELECTED HEATING ELEMENT | | . . . | 54b1 | 54b3 | 54b3 | 54b3 | 54b3 | 54b3 | 54b1 | 54b3 |
| POWER CALCULATION OF HEATING ELEMENT 54b1 | P | . . . | 15 | 12.5 | 12.5 | 12.5 | 10 | 10 | 10 | 10 |
| | I | . . . | 32.5 | 32.5 | 32.5 | 32.5 | 32.5 | 32.5 | 37.5 | 37.5 |
| | DUTY | . . . | 47.5 | 45 | 45 | 45 | 42.5 | 42.5 | 47.5 | 47.5 |
| POWER CALCULATION OF HEATING ELEMENT 54b3 | P | . . . | 22.5 | 17.5 | 17.5 | 17.5 | 15 | 15 | 15 | 15 |
| | I | . . . | 50 | 50 | 50 | 50 | 50 | 50 | 60 | 60 |
| | DUTY | . . . | 72.5 | 67.5 | 67.5 | 67.5 | 65 | 65 | 75 | 75 |
| ACTUAL POWER DUTY | | . . . | 47.5 | 67.5 | 67.5 | 67.5 | 65 | 65 | 47.5 | 75 |
| RATIO DP | | . . . | 1.02 | 1.04 | 1.04 | 1.04 | 1.02 | 1.02 | 0.99 | 0.99 |

Table 4 is composed of the following items in the named order from the top. That is, Table 4 is composed of timing n, time (unit: sec), target temperature (unit: ° C.), thermistor detection value (unit: ° C.), difference ΔT (unit: ° C.), and integrated value $\Delta T_v$ (unit: ° C.). Further, Table 4 is composed of a selected heating element to which power is supplied, a power calculation result of the heating elements **54*b*1 and 54*b*3** (proportional term P, integral term I, Duty (power duty)), actual power duty, and ratio DP. The ratio DP will be described below.

In Table 4, when timing n is 1 (time 0 sec), a thermistor detection value indicating the detection temperature of the heater 54 by the thermistor **59*a* is 215° C., and difference ΔT from the target temperature 220° C. is 5° C. (=220° C.-215° C.). Further, $\Delta T_v$ indicating the integrated value of difference ΔT in this state is 380° C. Since proportional term P when the difference ΔT is 5° C. is 15% based on Table 2, and since ΔI of integral term I is 0% based on Table 3, the power calculation of the heating element 54*b*1 will be $I=I_0+\Delta I=32.5\%$ based on Expression 4. As a result, power duty (Duty) will be 47.5% (=15%+32.5%). Similarly, since proportional term P when the difference ΔT is 5° C. is 22.5% based on Table 2, and ΔI of integral term I is 0% based on Table 3, the power calculation of the heating element 54*b*3 will be $I=I_0+\Delta I=50\%$ based on Expression 4. As a result, the power duty (Duty) will be 72.5% (=22.5%+50%). Since the selected heating element when timing n is 1 is 54*b*1, the power duty actually supplied to the heater 54** will be 47.5%.

Next, when timing n is 2 (time 0.020 sec), the thermistor detection value indicating the detection temperature of the heater 54 by the thermistor **59*a* is 216° C., and difference ΔT from the target temperature 220° C. is 4° C. (=220° C.-216° C.). Further, $\Delta T_v$ indicating the integrated value of difference ΔT in this state is 384° C. (=380° C.+4° C.). Since a proportional term P when difference ΔT is 4° C. is 12.5% based on Table 2, and since ΔI of integral term I is 0% based on Table 3, the power calculation of the heating element 54*b*1 will be $I_1=_{10}+\Delta I=32.5\%$ based on Expression 4. As a result, power duty (Duty) will be 45% (=12.5%+32.5%). Similarly, since proportional term P when the difference ΔT is 4° C. is 17.5% based on Table 2, and ΔI of integral term I is 0% based on Table 3, the power calculation of the heating element 54*b*3 will be $I_1=I_0+\Delta I=50\%$ based on Expression 4. As a result, power duty (Duty) will be 67.5% (=17.5%+50%). Since the selected heating element when the timing n is 1 is 54*b*3, the power duty actually supplied to the heater 54** will be 67.5%.

When timing n is 7 (time 0.120 sec), the thermistor detection value indicating the detection temperature of the heater 54 by the thermistor **59*a* is 217° C., and difference ΔT from the target temperature 220° C. is 3° C. (=220° C.-217° C.). Further, $\Delta T_v$ indicating the integrated value of difference ΔT in this state is 401° C. (=398° C.+3° C.). However, based on Table 3, when the integrated value $\Delta T_v$ is 400° C. or more, ΔI will be 5% in the case of the heating element 54*b*1 and 10% in the case of the heating element 54*b*3, instead of 0%. Further, the integrated value $\Delta T_v$ is temporarily reset when the integrated value exceeds 400° C. Therefore, integrated value $\Delta T_v$ will be 1 (=401-400). Since proportional term P when the difference $\Delta T$ is 3° C. is 10% based on Table 2, and $\Delta I$ of integral term I is 5% based on Table 3, the power calculation of the heating element 54*b*1 will be 17=16+ $\Delta I$=32.5%+5%=37.5% based on Expression 4. As a result, power duty (Duty) will be 47.5% (=10%+37.5%). Similarly, since proportional term P when the difference $\Delta T$ is 3° C. is 15% based on Table 2, and $\Delta I$ of integral term I is 10% based on Table 3, the power calculation of the heating element 54*b*3 will be I=16+$\Delta I$=50%+10%=60% based on Expression 4. As a result, power duty (Duty) will be 75% (=15%+60%). Since the selected heating element when the timing n is 7 is 54*b*1, the power duty actually supplied to the heater 54** will be 47.5%.

Ratio of Power Supplied to Heating Elements

In order to approximate and stabilize the temperature of the heater 54 detected by the thermistor **59*a* to target temperature by PI control serving as the first power control, the following is important. That is, even in a case where a power supply destination is switched to a heating element having a different resistance value, it is important that the amount of electric energy supplied to a center portion in the longitudinal direction of the heater 54 where the thermistor 59*a*** is arranged is not changed steeply, and that electric energy is supplied stably. In other words, it is important that even in a case where the heating element to which power is supplied is switched, the power supply per unit length in the longitudinal direction of the heating element does not change steeply.

Electric power W (unit: W/m) supplied per unit length in the longitudinal direction of the heating element is expressed by the following Expression 5, wherein AC voltage of the AC power supply 55 is represented by V, resistance value of the heating element is represented by R, longitudinal length (width) of the heating element is represented by L, and power duty is represented by D.

$$W=(V^2/R)\times D\times(1/L)=(V^2\times D)/(R\times L) \quad \text{Expression 5}$$

In order to prevent steep change of the electric power W supplied per unit length in the longitudinal direction of the heating element even when the heating element is switched, it is desirable to set the power duty D corresponding to the product of resistance value R and length L of the heating element for each heating element based on Expression 5.

Regarding the heating element **54*b*1, resistance value is represented by R1, longitudinal length is represented by L1, proportional term is represented by P1, initial value of integral term is represented by $I_0 1$, and power duty is represented by D1. Similarly, regarding the heating element 54*b*3, resistance value is represented by R2, longitudinal length is represented by L2, proportional term is represented by P2, initial value of integral term is represented by 102, and power duty is represented by D2. Further, a ratio of proportional term P per unit length of power duty supplied to the heating element 54*b*1 to proportional term P per unit length of power duty supplied to the heating element 54*b*3 is represented by PP. Similarly, a ratio of initial value $I_0$ of the integral term per unit length of power duty supplied to the heating element 54*b*1 to initial value $I_0$ of the integral term per unit length of power duty supplied to the heating element 54*b*3 is represented by $I_0P$. Further, a ratio of value per unit length of power duty D supplied to the heating element 54*b*1 to value per unit length of power duty D supplied to the heating element 54*b*3** is represented by DP.

The ratio PP of the proportion term P, the ratio TOP of initial value $I_0$ of the integral term, and the ratio DP per unit length of the power duty D described above are expressed by the following Expressions 6, 7, and 8.

$$PP=(P1/(R1\times L1))/(P2/(R2\times L2))=(P1/P2)\times((R2\times L2)/(R1\times L1)) \quad \text{Expression 6}$$

$$I_0P=(I_01/(R1\times L1))/(I_02/(R2\times L2))=(I_01/I_02)\times((R2\times L2)/(R1\times L1)) \quad \text{Expression 7}$$

$$DP=(D1/(R1\times L1))/(D2/(R2\times L2))=(D1/D2)\times((R2\times L2)/(R1\times L1)) \quad \text{Expression 8}$$

In order to prevent steep change of the electric power W per unit length in the longitudinal direction of the heating element expressed by Expression 5 during switching of heating elements, it is desirable to approximate the value of ratio DP expressed in Expression 8 to 1 as much as possible. Ratio $I_0P$ shown in Table 1 and ratio PP shown in Table 2 respectively indicate the value of ratio $I_0P$ calculated by Expression 7 and the value of ratio PP calculated by Expression 6. As shown in Tables 1 and 2, the values of ratio $I_0P$ and the value of ratio PP are close to 1. As described, the values of ratio $I_0P$ and ratio PP are close to 1, such that regardless of difference $\Delta T$ between the temperature of the heater 54 and the target temperature, the values of the proportional term P and integral term $I_0$ will not vary steeply before and after switching of heating elements. The values of ratio PP of the proportional term and ratio $I_0P$ of the integral term being close to 1 means that the ratio DP of power duty D which is represented by the summing of the proportional term P and integral term I will also be close to 1.

However, the following two cases are considered as causes that can make the ratio DP of the power duty D far from 1. The first case is a case where the total value of proportional term P and integral term I exceeds 100% or falls below 0% and the power duty D becomes 100% or 0%. A case where the fixing unit is started during which the fixing unit 50 is being warmed up toward the target temperature from a state where the heater 54 is at a temperature close to room temperature can be considered as a case where the power duty D becomes 100%. Meanwhile, a case where the detection temperature of the heater 54 by the thermistor **59*a* is significantly overshooting to target temperature, such as immediately after completing starting of the fixing unit 50, can be considered as a case where the power duty D becomes 0%. As described, the first case occurs during a transition period such as during warming up of the fixing unit 50. Therefore, when time is elapsed and the detection temperature of the thermistor 59*a*** approximates the target temperature to a certain extent, the value of power duty D is controlled between 0% and 100%, and the ratio DP of power duty per heating element approximates 1.

The second case that can make the ratio DP of the power duty D far from 1 is a case where the integral term I changes. As shown in Expression 4 described above, the integral term I may be changed along with the elapsed time. However, it has been confirmed by an experiment using the set value shown in Tables 1 and 3 that, according to the configuration of the present embodiment, the change of ratio DP of the power duty D is limited even if the integral term I is changed, such that the ratio DP falls within the range from 0.8 to 1.2, and steep change of power is suppressed. Further, an experiment was performed to change the value of the ratio DP of the power duty intentionally by changing the ratio of proportional term P and integral term I for each heating element using the configuration of the present embodiment. As a result of the experiment, there was a case where the detection temperature of the heater 54 by the thermistor 59*a* did not approximate the target temperature and the detection temperature repeated rising and falling when the ratio DP of the power duty was less than 0.7 or more than 1.3. As described, in order to stabilize temperature control of the heater 54 even when switching heating elements, the value of ratio DP of the power duty, i.e., ratio of first and second electric energies, is preferably maintained to a range of 0.7 or more and 1.3 or less. As shown in Table 4, the value of ratio DP of the power duty is preferably 0.9 or more and 1.1 or less, and more preferably, 0.95 or more and 1.05 or less.

As described above, in the present embodiment, the power supply to the heating element, i.e., amount of electric energy to be supplied, is changed based on PI control serving as the first power control, i.e., first control. That is, the electric energy, i.e., first electric energy (D1), to be supplied per unit period in a state where power is supplied to the heating element 54*b*1, i.e., first heating element, and the electric energy, i.e., second electric energy (D2), to be supplied per unit period in a state where power is supplied to the heating element 54*b*3, i.e., second heating element, are determined (S102 and S107 described below). Specifically, the ratio, i.e., power duty, of ON/OFF of power supply is changed by phase control. Thereby, the temperature of the heater 54 of the fixing unit 50 is controlled.

Further according to the present embodiment, electric energy per unit length of the heating element is represented by the resistance value and the longitudinal length of the heating element and the power duty D. The power duty is determined by PI control of the first power control, and according to the resistance value and longitudinal length, i.e., width, of the heating element, the amount of power duty D is changed. Specifically, the value of the power duty D is increased as the product having multiplied the resistance value and the longitudinal direction width of the heating element increases. Then, the value of ratio DP of the power duty D described above is set such that it approximates 1 as much as possible. According to this configuration, it becomes possible to prevent the electric energy per unit length supplied to the heating element during switching of heating elements from changing steeply, and to stabilize the temperature of the fixing unit 50.

Further according to the present embodiment, PI control in which two half-waves are set as a periodic unit is adopted, but the update cycle and control method of the PI control is not limited to those described above. Further according to the present embodiment, a method of changing the ratio of ON/OFF of power supply by phase control is adopted, but the method of controlling the power supply is not limited thereto. For example, the amount of electric energy to be supplied can be changed by providing a current limiter circuit and limiting the amplitude of current supplied from the AC power supply 55. Further, the selection of heating elements by the switcher described above is performed by the second power control described below, and the second power control will be described below.

Count-Based Temperature Prediction System

Next, a count-based temperature prediction system which is a prediction unit that predicts temperature of respective members of the fixing unit 50 will be described. In the present embodiment, the temperature of respective members, such as the film 51, the pressure roller 53, and the nip forming member 52, of the fixing unit 50 is predicted using a count value. The count value is updated by the CPU 94, and +1 is added each time a sheet P is subjected to fixing processing at the fixing unit 50. The count value increases as the number of sheets P subjected to fixing processing at the fixing unit 50 increases. Meanwhile, during a standby state after the fixing processing has ended, the respective members of the fixing unit 50 are automatically cooled, so that the count value is decremented over an elapsed time. Specifically, the cooling characteristics of the respective members of the fixing unit 50 are examined in advance, and the count value is reduced using an arithmetic expression using elapsed time as a variable. As described, the system of predicting temperature of the respective members of the fixing unit 50 by managing the count value is called a count-based temperature prediction system.

The CPU 94 refers to a period from a state where the count value is 0 to a first count value as zone 1, and a period from the first count value to a second count value as zone 2, wherein the switching frequency of the heating element is changed according to zone number. The number of zones is not limited to two, and it can be three or more. In the present embodiment, the first count value is set to 30, the second count value is set to 100, and the third count value is set to 200, wherein the zone is divided into four zones: zone 1, zone 2, zone 3, and zone 4. When printing is started from a cold state where the count value is 0 with the temperature of the fixing unit 50 at room temperature, the count value reaches 30 which is the first count value at a point of time when printing is performed to 30 sheets. Therefore, zone 1 ends when the fixing processing to the thirtieth sheet P ends, and the zone is switched to zone 2 from the thirty-first sheet P.

A case where continuous printing of A5-size sheets P is performed will be explained. In the present embodiment, the fixing unit 50 performs fixing operation of the sheet P by switching between the heating element 54*b*1 having the maximum longitudinal length, i.e., width, and the heating element 54*b*3 having the longitudinal width corresponding to the sheet width of the A5-size sheet P. In a case where continuous printing of B5-size sheets P is performed, the fixing unit 50 performs fixing operation of the sheet P by switching between the heating element 54*b*1 having the maximum longitudinal length, i.e., width, and the heating element 54*b*2 having the longitudinal width corresponding to the sheet width of the B5-size sheet P. Simultaneously, in a case where continuous printing is performed to A4-size or letter-size sheets P, the fixing unit 50 performs fixing operation of the sheet P using only the heating element 54*b*1 having the maximum longitudinal length, i.e., width. In the following description, printing is performed using A5-size sheets P as an example of performing printing of the sheets P.

In a state where the above-mentioned zone number is small, the respective members of the fixing unit 50 are in a low-temperature state, and in that case, greater power is supplied to the heating element 54*b*1 which is the heating element having the longest longitudinal length. The reason is to melt the grease within the film 51 uniformly across the longitudinal direction of the fixing nip portion N. Since grease will not melt uniformly in the longitudinal direction of the film 51 if there is an area where temperature is low due to uneven temperature, sliding friction of the film 51 will be uneven in the longitudinal direction, and as a result, the film 51 may be deformed.

Meanwhile, as the zone number increases, the respective members of the fixing unit 50 will be heated to higher temperature, according to which power is supplied by a certain proportion to the heating element 54*b*1, and more power is supplied to the heating element 54*b*3. Thereby, the deformation of the film 51 due to uneven sliding friction of the film 51 caused by the lowering of temperature of end portions in the longitudinal direction of the heating element is prevented. However, if the temperature of the end portions in the longitudinal direction of the heating element becomes too high, the temperature may exceed the resistant temperature of the film 51 and damage the film 51. Further, if the temperature of the end portions in the longitudinal direction of the heating element is too low or too high compared to the temperature of the center portion, it may lead to uneven temperature of the sheet P passing through the fixing nip portion N. As a result, too much or too little supply of heat to toner on the sheet P occurs at the end areas of the sheet P passing through the fixing nip portion N, and the image quality may be deteriorated. Therefore, in order to print the sheet P having a small sheet width, the temperature difference between a sheet passing area of the film 51 where the sheet P passes and a non-sheet passing area where the sheet P does not pass falls within an appropriate range preferably.

Second Power Control

In the present embodiment, as a second power control, control is performed to change the distribution of time or time allocation for performing power supply to the respective heating elements, and control is carried out such that the temperature difference in the longitudinal direction of the film 51 of the fixing unit 50 falls within the predetermined range. Specifically, power is supplied for a first period, which is a predetermined period, to the heating element **54*b*1. After elapse of the first period, power is supplied for a period that is a predetermined multiple of the first period to the heating element 54*b*3 corresponding to the A5-size sheet P. In the present embodiment, the first period is two half-waves of the voltage waveform of the AC power supply, i.e., corresponding to one cycle of the power supply cycle, having the same time width, or period, as the PI control cycle. As described, according to the present embodiment, the amount of electric energy to be supplied by PI control serving as the first power control is updated every first period, i.e., two half-wave cycle, and control is executed to perform power supply for a first period to the heating element 54*b*1, and then to perform power supply for a period that is a predetermined multiple of the first period to the heating element 54*b*3**.

Table 5 is a table that shows the zone number determined according to the counter value mentioned above, and a time ratio of power supply period of the heating element **54*b*3 to that of the heating element 54*b*1 in the corresponding zone. Time ratio X of Table 5 shows a value of the multiple of a case where a second period of supplying power to the heating element 54*b*3 is set as a predetermined multiple, i.e., a period of two half-waves of voltage waveform of the AC power supply, of the unit period with respect to the unit period which is a first period of supplying power to the heating element 54*b*1. That is, time ratio X is an example of predetermined time ratio that shows a target value, i.e., set value, of the ratio of the length of the period for supplying power to the second heating element by a second electric energy to the length of the period for supplying power to the first heating element by a first electric energy. The controller according to the present embodiment executes a second control, i.e., second power control, based on the time ratio X. Based on Table 5, in zone 1, power supply to the heating element 54*b*3 is not performed since the time ratio X is 0, whereas in zone 2, power supply to the heating element 54*b*3 is performed for the same time, i.e., first period, as the heating element 54*b*1 since the time ratio is 1. In zone 3 and zone 4, power supply to the heating element 54*b*3 is performed for three times, or five times, the first period of the heating element 54*b*1 according to the value of the time ratio X. That is, the controller changes the value of the time ratio used for second control such that the value of the time ratio of a case where the fixing unit is in a cold state, i.e., zone 1, becomes smaller than the value of the time ratio of a case where the fixing unit is heated, i.e., zone 4. In the present embodiment, the PI control cycle and the period for performing power supply to the heating element 54*b*1 are both set to be the same first period, but they are not necessarily set to the same time width, and the period of performing power supply to the heating element 54*b*1 can be set as a period of a predetermined multiple of the first period. As described, according to the present embodiment, by adjusting the time ratio X based on the zone number, the power distribution is approximated to the target value and the temperature in the longitudinal direction of the film 51** is controlled.

TABLE 5

| ZONE | 1 | 2 | 3 | 4 |
|---|---|---|---|---|
| TIME RATIO X | 0 | 1 | 3 | 5 |

Control Sequence of Power Supply to Heating Element

Figure 7:
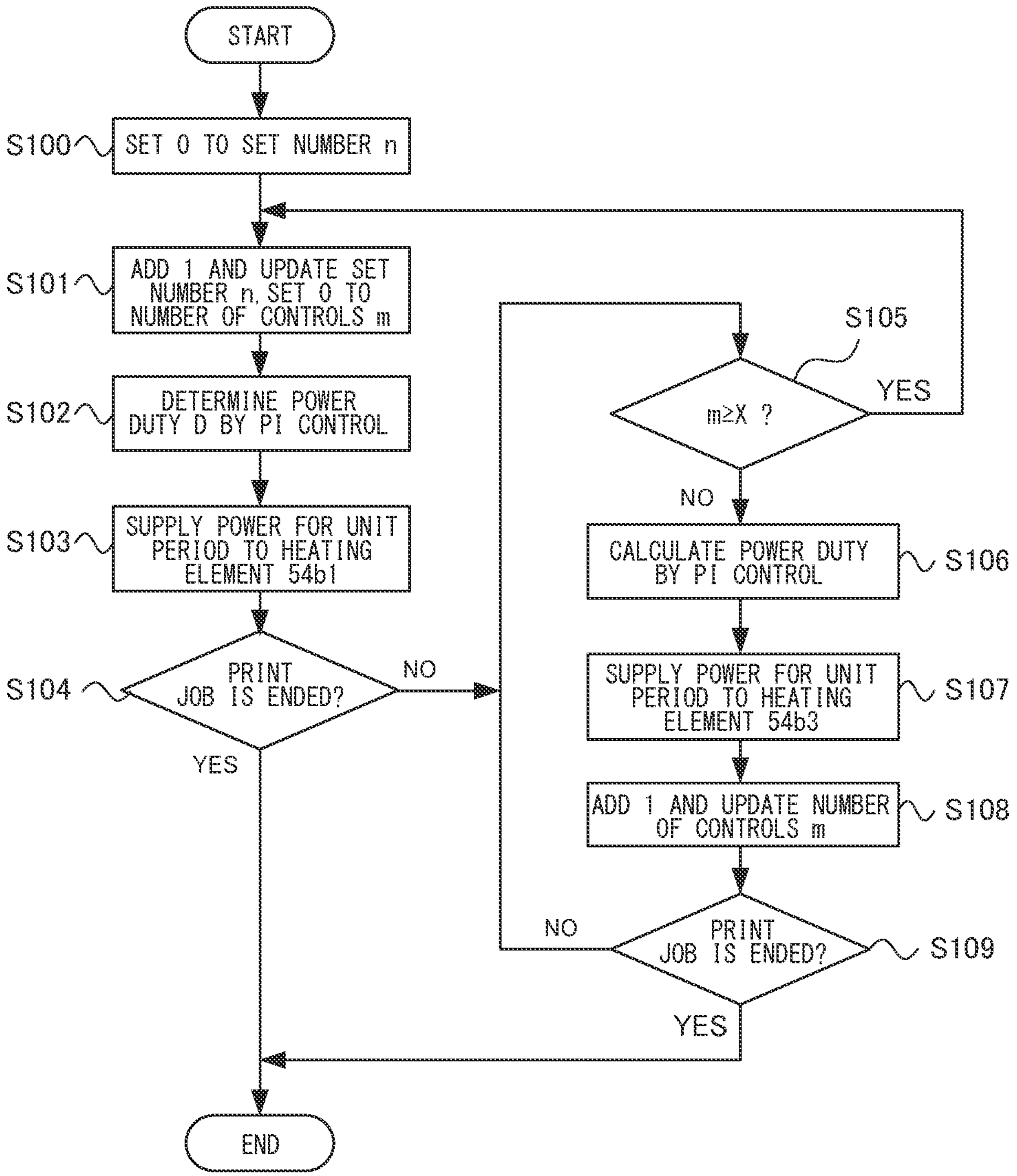
FIG. 7 is a flowchart illustrating a power supply control sequence of a heating element according to the first embodiment.

FIG. 7 is a flowchart illustrating a control sequence of performing power supply to the heating elements **54*b*1 and 54*b*3 when executing a print job of printing on A5-size sheets P The processing of FIG. 7 is started when a print job is started, and it is executed by the CPU 94. The power supply period to the heating element 54*b*3 is determined based on a time ratio according to zones corresponding to the counter value illustrated in Table 5 mentioned above. The counter value is updated by the CPU 94, but it is assumed to be executed by a different processing not shown in FIG. 7. Further, a process of supplying power to the heating element 54*b*1, thereafter switching and supplying power to the heating element 54*b*3, and thereafter switching back and supplying power again to the heating element 54*b*1** is called a set, and a set number is represented by n. Further, the number of updates of the proportional term P and the integral term I serving as set values of the PI control within one set is called a number of controls, and the number of controls is represented by m. The count of m is set to start from 0.

When a print job is started, in step (hereinafter abbreviated as S) 100, the CPU 94 sets 0 to the set number n. In S101, the CPU 94 updates the set number by adding 1 to the set number n, and sets 0 to the number of controls m. In S102, the CPU 94 determines the power duty D by PI control that calculates the values of the proportional term P and the integral term I of the heating element **54*b*1 based on the difference ΔT between temperature of the heater 54 detected by the thermistor 59*a* and the target temperature. In S103, the CPU 94 switches the power supply destination to the heating element 54*b*1, selects the power supply pattern from the memory 95 based on the power duty D calculated in S102, and performs power supply for a period of a predetermined unit cycle, which in this case is a two half-wave period (denoted as unit period in the drawing). In S104, the CPU 94 determines whether the print job is ended, and if it is determined that the job is not ended, the processing is advanced to S105**, whereas if it is determined that the job is ended, the processing is ended.

In S105, the CPU 94 compares the value of time ratio X set for the zone corresponding to the count value of Table 5 mentioned above and the value of the number of controls m. The CPU 94 returns the processing to S101 if it is determined that the value of the number of controls m is equal to the value of time ratio X or greater (m≥X), and advances the processing to S106 if it is determined that the value of the number of controls m is less than the time ratio X. In S106, the CPU 94 determines the power duty D by PI control that calculates the values of the proportional term P and the integral term I of the heating element 54*b*3 based on the difference ΔT between temperature of the heater 54 detected by the thermistor 59*a* and the target temperature. In S107, the CPU 94 switches the power supply destination to the heating element 54*b*3, selects the power supply pattern from the memory 95 based on the power duty D calculated in S107, and performs power supply for a period of a predetermined unit cycle, which in this case is a two half-wave period (denoted as unit period in the drawing). In S108, the CPU 94 adds 1 to the number of controls m and updates the number of controls m. In S109, the CPU 94 determines whether the print job is ended, and if it is determined that the job is not ended, the processing is returned to S105, whereas if it is determined that the job is ended, the processing is ended.

As described, according to the present embodiment, during an execution period of a job for forming an image on a recording material, a second control, i.e., second power control, corresponding to the flowchart of FIG. 7 excluding S102 and S107, is executed to switch by the switcher between a state of supplying power to the heating element 54*b*1, i.e., first heating element, by a first electric energy (D1) and a state of supplying power to the heating element 54*b*3, i.e., second heating element, by a second electric energy (D2). Now, the first electric energy and the second electric energy are the electric energy that is determined by a first control for approximating the heater temperature to target temperature. The heater temperature can be approximated to the target temperature suitable for fixing by adopting the first electric energy and the second electric energy determined by the first control, while the temperature of the non-sheet passing portion can be controlled to fall within an appropriate range based on the second control.

Further according to the present embodiment, a set operation is repeated. Each round of the set operation includes (i) a first operation of supplying power to the heating element 54*b*1 (S103) during one unit period and (ii) a second operation of supplying power to the heating element 54*b*3 continuously during a number of unit periods, which number is the number of controls m according to the time ratio X (m number of S107). The number of controls m represents a number of unit periods by which power supply (S107) to the heating element 54*b*3 is repeated in the second operation. That is, the controller according to the present embodiment repeats, by the second control, a set operation each including (i) the first operation of supplying power to the first heating element during one unit period and (ii) the second operation of supplying power to the second heating element continuously during the number of times of unit periods, which number corresponds to the time ratio.

Example of Power Supply to Heating Element

Next, a method for controlling power according to the present embodiment will be described. In the present embodiment, after supplying power for a predetermined period, i.e., first period, to the heating element 54*b*1, switching is performed to enable power to be supplied to the heating element 54*b*3 having a shorter longitudinal length compared to the heating element 54*b*1. When power supply period to the heating element 54*b*3 reaches a predetermined multiple, i.e., X times, of the power supply period to the heating element 54*b*1, switching is performed again to enable power to be supplied to the heating element 54*b*1, and power is supplied to the heating element 54*b*1. The following is a description illustrating an example of continuous printing of A5-size sheets P in a case where the count value corresponds to zone 4 shown in Table 5. According to the time ratio X of the case of zone 4, as shown in Table 5, the power supply period of the heating element 54*b*3 is five times (X=5) the power supply period of the heating element 54*b*1. Further, during one periodic unit, which according to the present example is a two half-wave period, the electric energy supplied to the heating element 54*b*1 is represented by $WL_{n,m}$ and the electric energy supplied to the heating element 54*b*3 is represented by $WS_{n,m}$.

Figure 8:
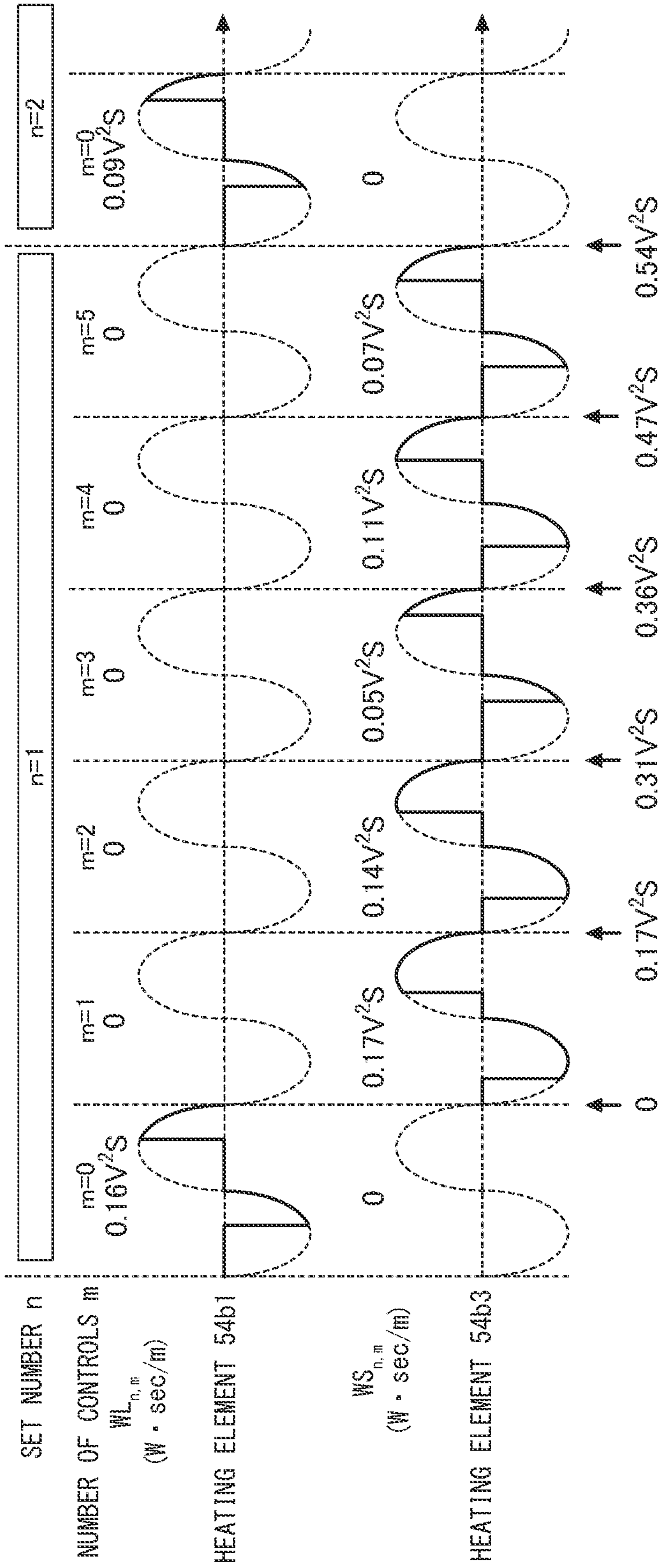
FIG. 8 is a diagram illustrating a state of power supply to the heating element according to the first embodiment.

A specific power supply example will be described with reference to FIG. 8. FIG. 8 is a view illustrating a state of power supply to the heating element 54*b*1 and the heating element 54*b*3 using an AC voltage waveform of the AC power supply 55. In FIG. 8, "heating element 54*b*1" illustrates a state of power supply to the heating element 54*b*1, and "heating element 54*b*3" illustrates a state of power supply to the heating element 54*b*3. Further according to FIG. 8, horizontal axis shows time, wherein the part shown by a solid line in the AC voltage waveform indicates a state where power is supplied based on a power supply pattern corresponding to the power duty, and the part shown by a broken line indicates a state where power is not supplied.

In the following expression, voltage of the AC power supply is represented by V, and the time of a smallest periodic unit corresponding to two half-waves is represented by S (sec). Further, when the set number n is 1 and the control m is 0, electric energy with a power duty D of 35% is supplied by PI control to the heating element 54*b*1, and the electric energy $WL_{n,m}$ per unit length is calculated as follows by Expression 5.

$$WL_{n,m}=(V^2/R)\times D\times(1/L)\times S$$

$$WL_{1,0}=(V^2/10\Omega)\times(1/222\text{ mm})\times S\times 35\%\approx 0.16\ V^2S\ (\text{W}\cdot\text{sec/m})$$

After electric energy $WL_{1,0}$ is supplied to the heating element 54*b*1, power supply is performed by switching the destination to the heating element 54*b*3 from the next periodic unit represented by the number of controls m of 1 (i.e., m=1 in FIG. 8). When the number of controls m is 1, electric energy with a power duty D of 80% is supplied by PI control, and the electric energy $WS_{n,m}$ per unit length is calculated as follows by Expression 5.

$$WS_{n,m}=(V^2/R)\times D\times(1/L)\times S$$

$$WS_{1,1}=(V^2/30\Omega)\times(1/154\text{ mm})\times S\times 80\%\approx 0.17\ V^2S\ (\text{W}\cdot\text{sec/m})$$

Thereafter, PI control of the heating element 54*b*3 is performed until the number of controls m reaches 5, and power is supplied to the heating element 54*b*3. As illustrated in FIG. 8, electric energy of 0.14 $V^2S$, 0.05 $V^2S$, 0.11 $V^2S$, and 0.07 $V^2S$ is respectively supplied to the heating element 54*b*3 during each of the periods where the number of controls m is 2 to 5. Since PI control is performed by two half-wave cycles, the power duty changes every time. Therefore, the electric energy supplied to the heating element 54*b*3 changes when the number of controls m is changed from 1 to 5.

Then, the power supply destination is switched again to the heating element 54*b*1, and a set whose set number n is 2 is started. During the period where the set number n is 1, the electric energy supplied to the heating element 54*b*1 is 0.16 $V^2S$, and the electric energy supplied to the heating element **54*b*3 is 0.54 $V^2S$. As a result, the ratio of electric energy supplied is as follows: heating element 54*b*1: heating element 54*b*3**=0.16 $V^2S$:0.54$V^2S$=1:3.4

Measurement of Energy Ratio

Experiments were performed under the following conditions to confirm the energy ratio mentioned above, i.e., the ratio of electric energy supplied to heating elements. In the circuit illustrated in FIG. 6, an ammeter was arranged between the triac **56*a* and the heating element 54*b*1 and between the triac 56*b* and the heating elements 54*b*2 and 54*b*3 to measure the current flowing to each heating element of the heater 54. Then, continuous printing to the sheets P was performed for a plurality of times with the feeding interval of the sheets P fed from a cassette 16 fixed so as to stabilize the quantity of heat of the fixing unit 50. In the present embodiment, printing of 20 sheets P was set as one print job, and time interval between print jobs was set to three minutes. Thereby, the temperature near a center portion in the longitudinal direction of the pressure roller of the fixing unit 50 before starting printing was approximately 90° C. each time, and the temperature of the fixing unit 50 was stabilized. The zone according to the count value in that state was zone 4. In such a stabilized state, the current value during continuous printing was measured, and based on the resistance value of the heating elements 54*b*1 and 54*b*3 of the heater 54 measured in advance, the electric power W supplied to the heating elements 54*b*1 and 54*b*3** was calculated. Further, a mean value of the current value of the plurality of sheets P was calculated as a current measurement value. By repeating the above-mentioned operation, a ratio of electric energies having accumulated the power supplied to each of the heating elements was calculated.

Table 6 is a table showing the results of the experiment described above performed three times. In Table 6, measured energy ratio shows the ratio, in each experiment, of the electric energy supplied to the heating element **54*b*3 to the electric energy supplied to the heating element 54*b*1, and a film end temperature shows a maximum temperature of the end portions of the film 51 (unit: ° C.). From Table 6, it can be recognized that the maximum temperature of the end portion of the film 51 falls within a certain range. As escribed, by performing the above-mentioned control, the temperature of a center portion in the longitudinal direction of the fixing film 51 of the fixing unit 50** was controlled to fall within the certain range while the temperature of the end portions was also controlled to fall within the certain range.

TABLE 6

| EXPERIMENT | MEASURED ENERGY RATIO | FILM END TEMPERATURE [° C.] |
|---|---|---|
| 1st | 1:3.5 | 230 |
| 2nd | 1:3.1 | 235 |
| 3rd | 1:4.2 | 223 |

Flickering

Depending on the switching frequency of the heating element, flickering may increase. Flickering is a phenomenon in which, in a case where a common AC power supply is used to supply power to the heating apparatus and to a lighting equipment, steep change of current of the heating apparatus may cause fluctuation of the lighting voltage and flickering of the lighting occurs. In the present embodiment, by lowering the switching frequency of the heating element, the frequency of change of current may be lowered and flickering may be reduced. Meanwhile, if the switching frequency of the heating element is lowered, rising or dropping of end portion temperature in the longitudinal direction of the film 51 may occur. For example, if the power supply cycle of the AC power supply is set to 50 Hz, the maximum time of connection of the AC power supply to one heating element is 0.1 sec in the case of the heating element **54*b*3. By extending the time for supplying power continuously to one heating element and intentionally lowering the switching frequency, lowering of temperature of the end portions in the longitudinal direction of the film 51 occurs when the time during which power is supplied to the heating element 54*b*3 exceeds 32 sec, and there was a possibility of occurrence of insufficient melting of toner on the sheet P. Therefore, even if the switching frequency of the heating element is lowered, the time during which power is supplied to one heating element is preferably 32 sec or shorter. Further according to the present embodiment, the period for supplying power to the heating element 54*b*3 is set based on the period for supplying power to the heating element 54*b*1, but in contrast, it may be possible to set the period for supplying power to the heating element 54*b*1 based on the period for supplying power to the heating element 54*b*3. Even according to this case, control can be performed to have the temperature of the center portion in the longitudinal direction of the fixing film 51 of the fixing unit 50** fall within the certain range and to have the temperature of the end portions also fall within the certain range.

As described above, according to the present embodiment, temperature control of the fixing unit can be performed with high accuracy so as not to cause temperature rise in the non-sheet passing portion.

Second Embodiment

In the first embodiment, a control of simultaneously performing PI control for approximating the detection temperature of the thermistor to the target temperature as the first power control and a power control of approximating the electric energy to the target value by changing the time distribution for supplying power to the respective heating elements as the second power control was described. In the second embodiment, first control is performed in a similar manner as the first embodiment, and as for the second control, a control of approximating the electric energy actually supplied to each of the heating elements to the electric energy of a target value will be described. The configuration of the image forming apparatus including the fixing unit according to the present embodiment and that of the first embodiment are similar, so descriptions thereof are omitted by using the same reference numerals as the first embodiment for the same apparatuses and components.

Second Power Control

In the present embodiment, as a second power control, accumulated electric energy supplied to the heating element by PI control serving as a first power control is approximated to a distribution value of electric energy set as target. Specifically, a temperature of an area in the longitudinal direction of the film 51 of the fixing unit 50 is controlled by adjusting the ratio of accumulated electric energy to be supplied to the heating element **54*b*1 having the longest longitudinal length and to the heating element 54*b*3** corresponding to a sheet width of an A5-size sheet. In the description, “accumulated electric energy” refers to a value having accumulated the electric energy per unit length of the heating element calculated based on the resistance value of the heating element, the longitudinal length, i.e., width, and power duty described in the first embodiment. By controlling the accumulated electric energy per unit length, the heat quantity at an area in the longitudinal direction can be controlled more precisely regardless of the resistance value or the width of the longitudinal direction of the heating element.

Table 7 shows zone numbers determined according to the counter value of the count-based temperature prediction system described in the first embodiment and energy ratios in the corresponding zones. The energy ratio is a ratio of the amount of electric energy to be supplied to the heating element **54*b*3 with respect to that to the heating element 54*b*1. The energy ratio X of Table 7 shows a multiple value of the electric energy to be supplied to the heating element 54*b*3 with respect to the electric energy supplied to the heating element 54*b*1 within a unit period. In other words, the energy ratio X is an example of a predetermined energy ratio that shows a target value, i.e., set value, of the ratio of the accumulated amount of electric energy per unit length of the second heating element that is to be supplied to the second heating element to the accumulated amount of the electric energy per unit length of the first heating element supplied to the first heating element. In the present embodiment, the controller executes a second control, i.e., second power control, based on the energy ratio X, which is the energy ratio mentioned above. Based on Table 7, in zone 1, power supply to the heating element 54*b*3 is not performed since the energy ratio X is 0, whereas in zone 2, the same electric energy as the electric energy supplied to the heating element 54*b*1 is supplied to the heating element 54*b*3. In zone 2 and zone 3, the electric energy to be supplied to the heating element 54*b*3 is, respectively, three times and five times the electric energy supplied to the heating element 54*b*1** according to the value of the energy ratio X. That is, the controller changes the value of the energy ratio used for second control such that the value of the energy ratio of a case where the fixing unit is in a cold state, i.e., zone 1, becomes smaller than the value of the energy ratio of a case where the fixing unit is heated, i.e., zone 4. In the present embodiment, the ratio of electric energy per unit length of the heating element is used as an index, but it is merely necessary to control the ratio between values of the accumulated electric energy of the plurality of heating elements.

TABLE 7

| ZONE | 1 | 2 | 3 | 4 |
|---|---|---|---|---|
| ENERGY RATIO X | 0 | 1 | 3 | 5 |

Control Sequence of Power Supply to Heating Element

Figure 9:
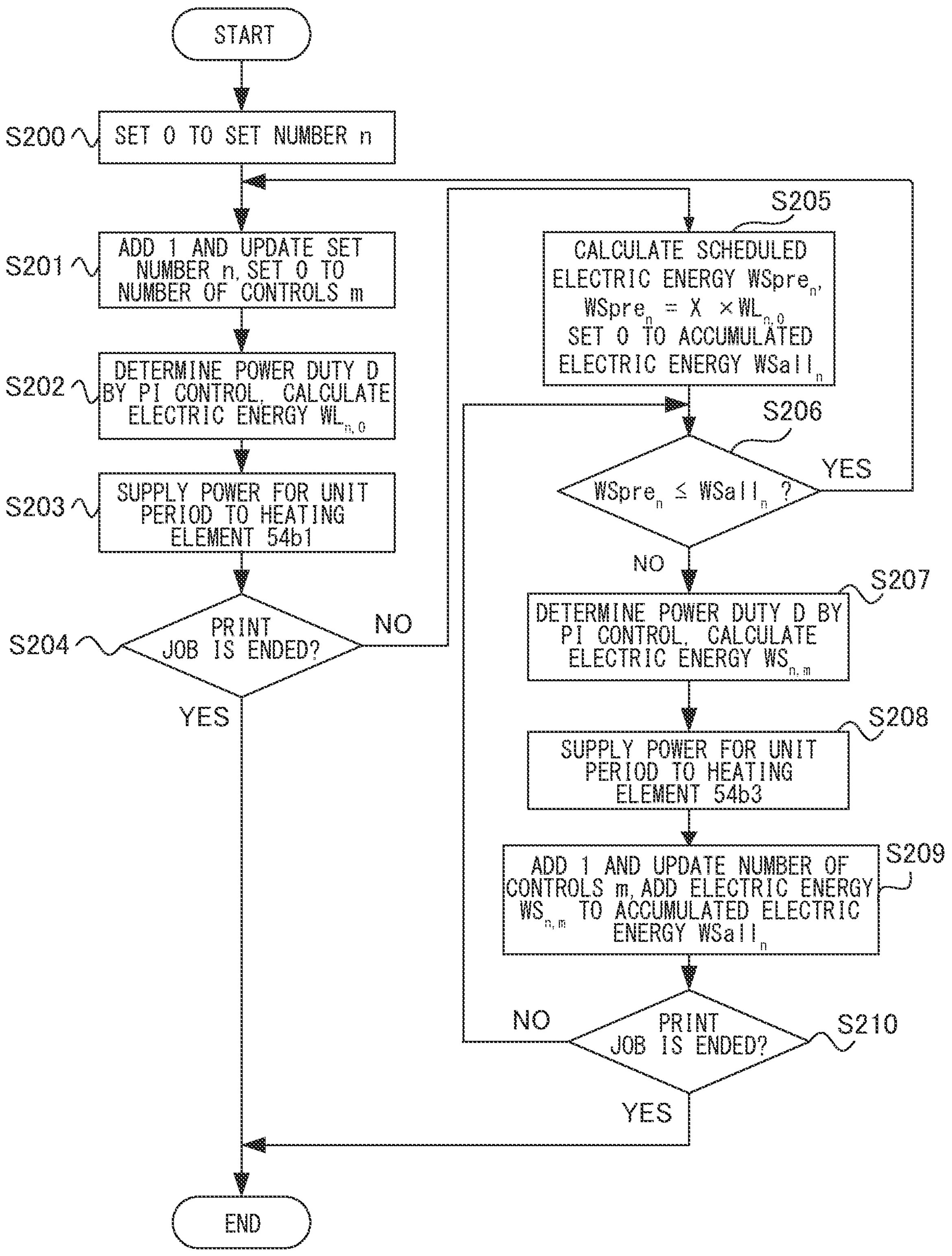
FIG. 9 is a flowchart illustrating a power supply control sequence of a heating element according to the second embodiment.

FIG. 9 is a flowchart illustrating a control sequence of performing power supply to the heating elements **54*b*1 and 54*b*3 when executing a print job of printing on A5-size sheets P The processing of FIG. 9 is started when a print job is started, and it is executed by the CPU 94. The electric energy supplied to the heating element 54*b*3 is determined based on the energy ratio according to zones corresponding to the counter value illustrated in Table 7 mentioned above. The counter value is updated by the CPU 94, but it is assumed to be executed by a different processing not shown in FIG. 9. Further, similarly as FIG. 7** of the first embodiment, the set number is represented by n, and the number of controls is represented by m.

When a print job is started, in S200, the CPU 94 sets 0 to the set number n.

In S201, the CPU 94 updates the set number n by adding 1 to the set number n, and sets 0 to the number of controls m. In S202, the CPU 94 determines the power duty D by PI control that calculates the values of the proportional term P and the integral term I of the heating element **54*b*1 based on the difference ΔT between temperature of the heater 54 detected by the thermistor 59*a* and the target temperature. Then, the CPU 94 calculates an electric energy $WL_{n,0}$ per unit length of the heating element 54*b*1. In S203, the CPU 94 switches the power supply destination to the heating element 54*b*1, selects the power supply pattern from the memory 95 according to the power duty D calculated in S202, and performs power supply for a period of a predetermined unit cycle, which in this case is a two half-wave period (denoted as unit period in the drawing). In S204, the CPU 94 determines whether the print job is ended, and if it is determined that the job is not ended, the processing is advanced to S205**, whereas if it is determined that the job is ended, the processing is ended.

In S205, the CPU 94 acquires the value of the energy ratio X set for the zone corresponding to the count values of Table 7 and determines an electric energy $WSpre_n$ that is scheduled to be supplied to the heating element **54*b*3 within the same set. The electric energy $WSpre_n$ is X times the electric energy of $WL_{n,0}$, and the CPU 94 calculates the scheduled electric energy $WSpre_n$ using the expression of scheduled electric energy $WSpre_n$=the electric energy $WL_{n,0}$ supplied to the heating element 54*b*1×X. Further, the CPU 94 sets 0 to an accumulated electric energy $WSall_n$ that denotes a total, or accumulated quantity, of electric energy supplied to the heating element 54*b*3** within the same set.

In S206, the CPU 94 performs magnitude comparison of the scheduled electric energy $WSpre_n$ and the accumulated electric energy $WSall_n$. If it is determined that the accumulated electric energy $WSall_n$ is equal to or greater than the scheduled electric energy $WSpre_n$ ($WSpre_n \leq WSall_n$), the CPU 94 returns the processing to S201. Meanwhile, if it is determined that the accumulated electric energy $WSall_n$ is smaller than the scheduled electric energy $WSpre_n$, the CPU 94 advances the processing to S207.

In S207, the CPU 94 determines the power duty D by PI control that calculates the values of the proportional term P and the integral term I of the heating element **54*b*3 based on the difference ΔT between temperature of the heater 54 detected by the thermistor 59*a* and the target temperature. Then, the CPU 94 calculates an electric energy $WS_{n,m}$ per unit length of the heating element 54*b*3. In S208, the CPU 94 switches the power supply destination to the heating element 54*b*3, selects the power supply pattern from the memory 95 according to the power duty D calculated in S207, and performs power supply for a period of a predetermined unit cycle, which in this case is a two half-wave period (denoted as unit period in the drawing). In S209, the CPU 94 adds 1 to the number of controls m and updates the number of controls m. Further, the CPU 94 adds the electric energy $WS_{n,m}$ to the accumulated electric energy $WSall_n$ and updates the accumulated electric energy $WSall_n$. In S210, the CPU 94 determines whether the print job is ended, and if it is determined that the job is not ended, the processing is returned to S206**, whereas if it is determined that the job is ended, the processing is ended.

As described, also according to the present embodiment, during an execution period of a job for forming an image on a recording material, a second control, i.e., second power control, corresponding to the flowchart of FIG. 9 excluding S202 and S207, is executed to switch by the switcher between a state of supplying power to the heating element **54*b*1, i.e., first heating element, by a first electric energy (D1) and a state of supplying power to the heating element 54*b*3**, i.e., second heating element, by a second electric energy (D2). Now, the first electric energy and the second electric energy are the electric energy that is determined by a first control for approximating the heater temperature to target temperature. The heater temperature can be approximated to the target temperature suitable for fixing by using the first electric energy and the second electric energy determined by the first control, while the temperature of the non-sheet passing portion can be controlled to fall within an appropriate range based on the second control.

Further according to the present embodiment, during one unit period, after the operation (S203) of supplying power to the heating element 54_b_1, the operation (S205 to S210) of supplying power to the heating element 54_b_3 is performed continuously while the accumulated electric energy $WSall_n$ at the point of time when the next unit period is started is smaller than the scheduled electric energy $WSpre_n$. That is, the controller according to the present embodiment repeats a set operation by second control. Each round of the set operation includes (i) a first operation of supplying power to the first heating element during one unit period and (ii) a second operation of supplying power to the second heating element while the accumulated amount of electric energy having been supplied to the second heating element by the start of the next unit period is less than the scheduled electric energy. In the present embodiment, the scheduled electric energy is a product of electric energy $WL_{n,0}$ per unit length of the heating element 54_b_1 based on the first electric energy determined by the first control and the predetermined energy ratio X.

Example of Power Supply to Heating Element

Next, a method for controlling power according to the present embodiment will be described. In the present embodiment, after supplying power for a predetermined period to the heating element 54_b_1, switching is performed to enable power to be supplied to the heating element 54_b_3 having a smaller heating value of the end portions in the longitudinal direction compared to the heating element 54_b_1. When supplied electric energy (accumulated electric energy) to the heating element 54_b_3 reaches a predetermined multiple, i.e., X times, of the supplied electric energy to the heating element 54_b_1, switching is performed again to enable power to be supplied to the heating element 54_b_1, and power is supplied to the heating element 54_b_1. The following is a description illustrating an example of continuous printing of A5-size sheets Pin a case where the count value corresponds to zone 4 shown in Table 7. According to the time ratio X of the case of zone 4, as shown in Table 7, the amount of electric energy to be supplied to the heating element 54_b_3 is five times (X=5) the amount of electric energy to be supplied to the heating element 54_b_1. Further, during one periodic unit, which according to the present example is a two half-wave period, the electric energy supplied to the heating element 54_b_1 is represented by $WL_{n,m}$ and the electric energy supplied to the heating element 54_b_3 is represented by $WS_{n,m}$.

Figure 10:
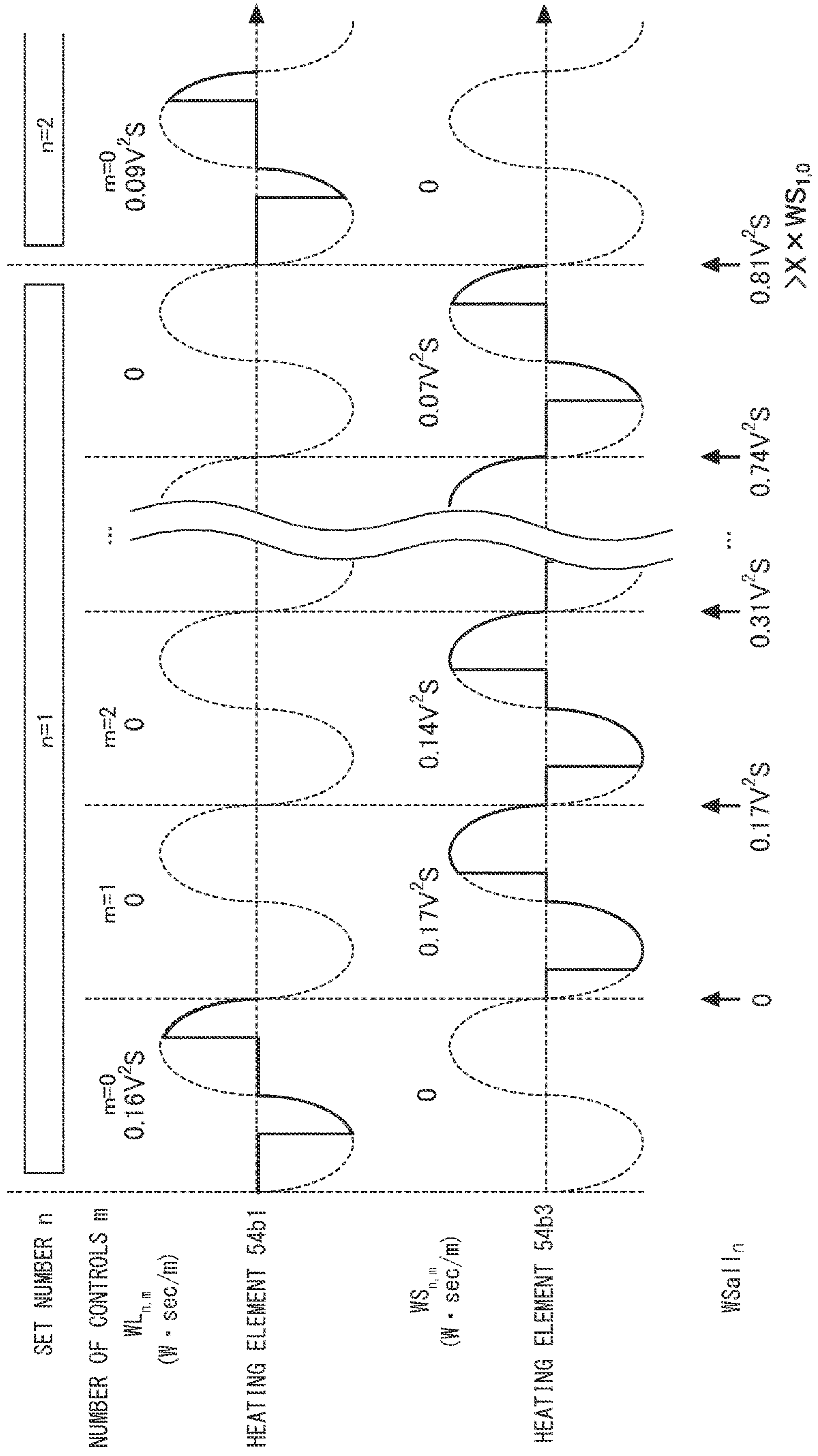
FIG. 10 is a view illustrating a state of power supply to the heating element according to the second embodiment.

A specific power supply example will be described with reference to FIG. 10. FIG. 10 is a view illustrating a state of power supply to the heating element 54_b_1 and the heating element 54_b_3 using an AC voltage waveform of the AC power supply 55. In FIG. 10, "heating element 54_b_1" illustrates a state of power supply to the heating element 54_b_1, and "heating element 54_b_3" illustrates a state of power supply to the heating element 54_b_3. Further according to FIG. 10, horizontal axis shows time, wherein the part shown by a solid line in the AC voltage waveform indicates a state where power is supplied based on a power supply pattern according to the power duty, and the part shown by a broken line indicates a state where power is not supplied. Furthermore, $WSall_n$ represents the accumulated electric energy supplied to the heating element 54_b_3 within the same set n.

In the following expression, voltage of the AC power supply is represented by V, and the time of a smallest periodic unit corresponding to two half-waves is represented by S (sec). Further, when the set number n is 1 and the control m is 0, electric energy with a power duty D of 35% is supplied by PI control to the heating element 54_b_1, and the electric energy $WL_{n,m}$ per unit length is calculated as follows.

$$WL_{n,m}=(V^2/R)\times D\times(1/L)\times S$$

$$WL_{1,0}=(V^2/10\Omega)\times(1/222\text{ mm})\times S\times 35\%\approx 0.16\ V^2S\ (\text{W}\cdot\text{sec/m})$$

After electric energy $WL_{1,0}$ is supplied to the heating element 54_b_1, power supply is performed by switching the destination to the heating element 54_b_3_f_ from the next periodic unit represented by the number of controls m of 1. When the number of controls m is 1, electric energy with a power duty D of 80% is supplied by PI control, and the electric energy $WS_{n,m}$ per unit length is calculated as follows.

$$WS_{n,m}=(V^2/R)\times D\times(1/L)\times S$$

$$WS_{1,1}=(V^2/30\Omega)\times(1/154\text{ mm})\times S\times 80\%\approx 0.17\ V^2S\ (\text{W}\cdot\text{sec/m})$$

If the total power supplied to the heating element 54_b_3 is denoted by $WSall_n$, the total power can be represented as follows:

$$WSall_n=WS_{n,1}+WS_{n,2}+WS_{n,3}\ldots$$

Thereafter, the CPU 94 continues PI control, and supplies power to the heating element 54_b_3 until the value exceeds $WSall_1=X\times WL_{1,0}=5\ WL_{1,0}\approx 0.79\ V^2S$ (W·sec/m). Then, the power supply destination is switched again to the heating element 54_b_1, and the set whose set number n is 2 is started. During the period where the set number n is 1, the electric energy supplied to the heating element 54_b_1 is 0.16 $V^2S$, the electric energy supplied to the heating element 54_b_3 is 0.81 $V^2S$, and the ratio of electric energy of the heating element 54_b_3 to the heating element 54_b_1 is approximately five. By performing the above-mentioned control, in the present embodiment, the ratio of electric energy actually supplied to the heating element and the value of the energy ratio set by the energy ratio X are approximated.

Measurement of Energy Ratio

Also according to the present embodiment, experiments were performed under a similar condition as the first embodiment, and measurement of electric energy supplied to the heating element and measurement of temperature of a non-sheet passing portion of the film 51 were performed. Table 8 is a table showing the results of the experiment described above performed three times. In Table 8, measured energy ratio shows the ratio, in each experiment, of electric energy supplied to the heating element 54_b_1 to the electric energy supplied to the heating element 54_b_3, and a film end temperature shows a maximum temperature of the end portions of the film 51 (unit: ° C.). From Table 8, it can be recognized that an energy ratio, i.e., 1:5, substantially close to the target value is realized, and that the maximum temperature of the end portions of the film 51 falls within a certain range. As escribed, by performing the above-mentioned control, the temperature of a center portion in the longitudinal direction of the fixing film 51 of the fixing unit 50 was controlled to fall within the certain range while the temperature of the end portions was also controlled to fall within the certain range.

TABLE 8

| EXPERIMENT | MEASURED ENERGY RATIO | FILM END TEMPERATURE [° C.] |
|---|---|---|
| 1st | 1:5.2 | 214 |
| 2nd | 1:4.9 | 210 |
| 3rd | 1:5.1 | 213 |

As have been described above, according to the present embodiment, temperature control of the fixing unit can be carried out highly accurately such that temperature rise in the non-sheet passing portion will not occur.

Third Embodiment

In the second embodiment, a control was performed to end supply of power to the second heating element when it is detected that the accumulated electric energy supplied to the second heating element has exceeded the predetermined multiple of the electric energy supplied to the first heating element. Therefore, the electric energy supplied to the second heating element will necessarily be greater than the predetermined multiple of the electric energy supplied to the first heating element. In the third embodiment, the electric energy to be supplied to the second heating element in the subsequent round of the set operation is adjusted by cutting down an excessive electric energy in the previous round of the set operation. The excessive electric energy is an amount of electric energy by which the accumulated electric energy (WSall) supplied to the second heating element in the previous round of the set operation exceeded a scheduled electric energy (WSpre), i.e., the predetermined multiple of the electric energy supplied to the first heating element. The configuration of the image forming apparatus including the fixing unit according to the present embodiment and that of the first and second embodiments are similar, so descriptions thereof are omitted by using the same reference numerals as the first embodiment for the same apparatuses and components.

Control Sequence of Power Supply to Heating Element

Figure 11:
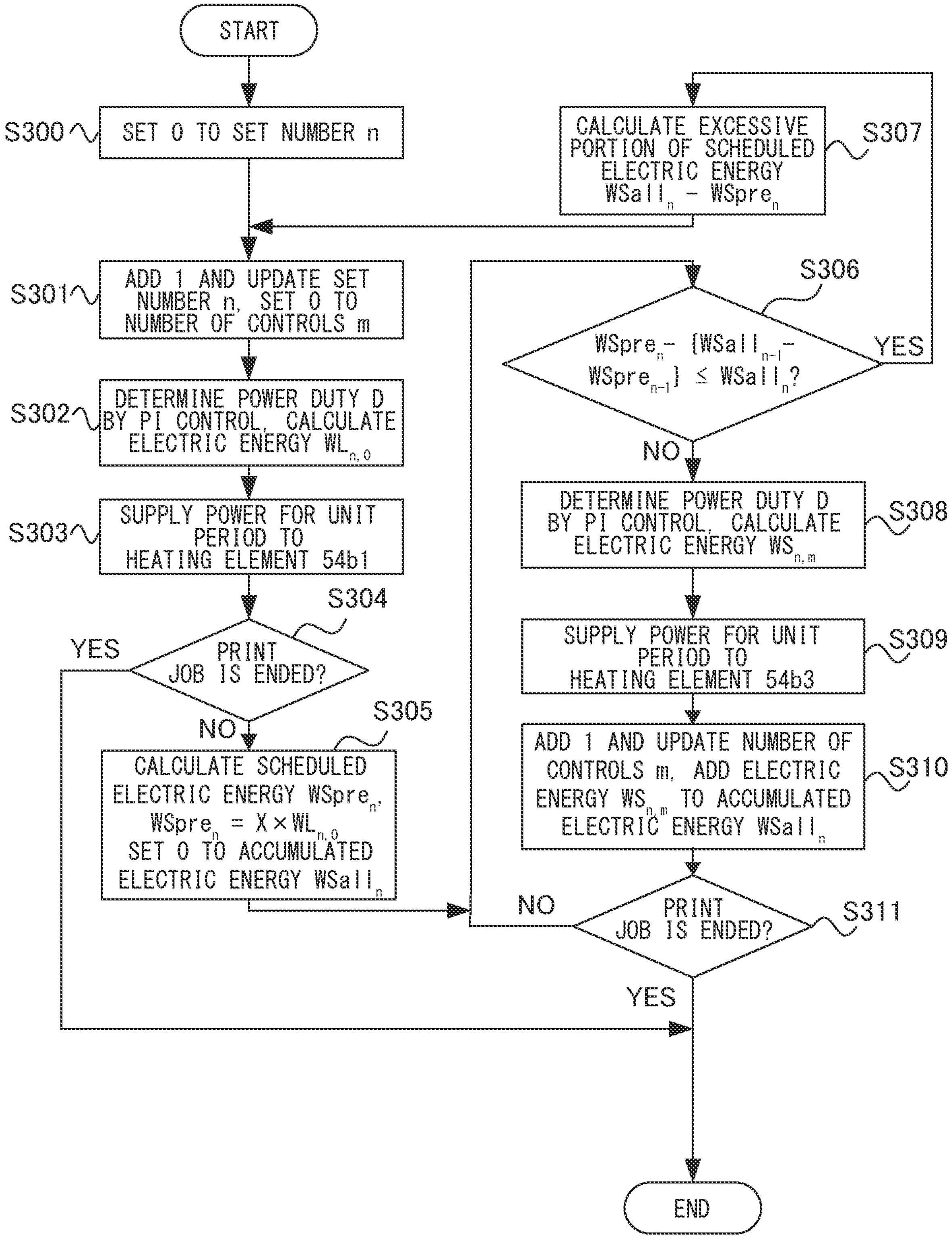
FIG. 11 is a flowchart illustrating a power supply control sequence of a heating element according to the third embodiment.

FIG. 11 is a flowchart illustrating a control sequence of performing power supply to the heating elements **54*b*1 and 54*b*3 when executing a print job of printing on A5-size sheets P The processing of FIG. 11 is started when a print job is started, and it is executed by the CPU 94. The electric energy supplied to the heating element 54*b*3 is determined based on the energy ratio according to zones corresponding to the counter value illustrated in Table 7 according to the second embodiment. The counter value is updated by the CPU 94, but it is assumed to be executed by a different processing not shown in FIG. 11. Further, similarly as FIG. 9** of the second embodiment, the set number is represented by n, and the number of controls is represented by m.

In FIG. 11, the processing of S300 to S305 and the processing of S200 to S205 of the second embodiment illustrated in FIG. 9 are similar, so the descriptions thereof are omitted.

In S306, the CPU 94 performs magnitude comparison between the accumulated electric energy $WSall_n$ supplied to the heating element **54*b*3 and the scheduled electric energy scheduled to be supplied to the heating element 54*b*3 in the same set n. In the present embodiment, the scheduled electric energy scheduled to be supplied to the heating element 54*b*3 is calculated as follows. That is, the scheduled electric energy is the electric energy having subtracted the electric energy supplied over a scheduled quantity of energy to the heating element 54*b*3 in the previous set (n−1) from the scheduled electric energy $WSpre_n$ obtained by multiplying the electric energy of the electric energy $WL_{n,0}$ supplied to the heating element 54*b*1 by the energy ratio X. That is, the controller of the present embodiment determines the scheduled electric energy for the next set operation (i.e., subsequent round of the set operation) as the value having subtracted (i) the excessive amount or excessive electric energy by which the accumulated amount of the electric energy supplied to the second heating element in the previous set operation (i.e., previous round of the set operation) has exceeded the scheduled electric energy from (ii) the product of energy ratio and electric energy per unit length of the first heating element based on the first electric energy. The electric energy supplied exceeding the scheduled quantity to the heating element 54*b*3 during the previous set (n−1) is represented by $WSall_{(n-1)}-WSpre_{(n-1)}$. Therefore, the scheduled electric energy at set n is represented by $WSpre_n-(WSall_{(n-1)}-WSpre_{(n-1)})$. The CPU 94 advances the processing to S307 when it is determined that the accumulated electric energy $WSall_n$ is equal to or greater than the scheduled electric energy $(WSpre_n-(WSall_{(n-1)}-WSpre_{(n-1)}))$, and advances the processing to S308** when it is determined that the accumulated electric energy is smaller than the scheduled electric energy.

In S307, the CPU 94 calculates the excessive portion of the scheduled electric energy during set n based on $WSall_n-WSpre_n$, which is stored in the memory 95 for reference in the processing of S306 of the subsequent set (n+1), and the processing is returned to S301. The processing of S308 to S311 and the processing of S207 to S210 of the second embodiment illustrated in FIG. 9 are similar, so the descriptions thereof are omitted.

Measurement of Energy Ratio

Also according to the present embodiment, experiments were performed under a similar condition as the second embodiment, and measurement of electric energy supplied to the heating element and measurement of temperature of a non-sheet passing portion of the film 51 were performed. Table 9 is a table showing the results of the experiment described above performed three times. In Table 9, measured energy ratio shows the ratio, in each experiment, of electric energy supplied to the heating element **54*b*1 to the electric energy supplied to the heating element 54*b*3, and a film end temperature shows a maximum temperature of the end portion of the film 51 (unit: ° C.). The value of the measured energy ratio illustrated in Table 9 has a smaller dispersion than the measured energy ratio illustrated in table 8 according to the second embodiment, and as a result, the dispersion of the temperature of the end portions of the film 51** is also smaller than the second embodiment.

TABLE 9

| EXPERIMENT | MEASURED ENERGY RATIO | FILM END TEMPERATURE [° C.] |
|---|---|---|
| 1st | 1:5.0 | 212 |
| 2nd | 1:5.1 | 213 |
| 3rd | 1:5.0 | 212 |

As have been described above, according to the present embodiment, temperature control of the fixing unit can be carried out highly accurately such that temperature rise in the non-sheet passing portion will not occur.

Fourth Embodiment

In the third embodiment, when performing continuous printing of sheets P by fixing the feeding interval of the sheets P supplied from a cassette 16, it was possible to stabilize the temperature distribution of the end portions in the longitudinal direction of the film 51. However, in a state where the interval between the preceding sheet P and the succeeding sheet P, hereinafter called sheet interval, is extended, the temperature of the end portions in the longitudinal direction of the film 51 may drop, which may lead to deterioration of image quality. The present embodiment will describe the heating element control of a case where the sheet interval is extended. The configuration of the image forming apparatus including the fixing unit according to the present embodiment and that of the third embodiment are similar, so that descriptions thereof are omitted by using the same reference numerals as the third embodiment for the same apparatuses and components.

Second Power Control

If the sheet interval between the preceding sheet and the succeeding sheet is extended, the amount of heat of the film 51 absorbed by the A5-size sheet P passed through the fixing nip portion N is reduced, such that when heating of the heater 54 is continued, the amount of heat of the center portion in the longitudinal direction of the film 51 becomes excessive. Actually, the temperature of the heater 54 is controlled such that the temperature of the center portion of the heater 54 becomes constant based on the temperature detected by the thermistor 59*a* arranged at the center portion in the longitudinal direction of the heater 54. Therefore, when the sheet interval is extended, the temperature of the end portions in the longitudinal direction of the film 51 may drop if control is performed based on a fixed ratio X of the accumulated electric energy of the heating element 54*b*1 to that of the heating element 54*b*3. For example, the sheet interval is extended in a case where a long time is required to convert the image data received by the video controller 91 from the PC 110 into exposure data for transfer to the exposure control apparatus 93. In that case, the CPU 94 extends the sheet interval between the sheets P being conveyed from the cassette 16 and controls the timing such that a leading-edge position of the sheet P matches the timing of the color image formed on the intermediate transfer belt 13.

Therefore, according to the present embodiment, in a case where the sheet interval is extended, if power is being supplied to the heating element 54*b*3, the CPU 94 performs control to switch the power supply destination to the heating element 54*b*1 that heats the entire length of the longitudinal direction such that power is supplied to the heating element 54*b*1 during the long sheet interval period. Thereby, in a section where the sheet interval is long, during which time heat will not be absorbed by the A5-size sheet from the film 51, the entire length in the longitudinal direction of the fixing nip portion N is heated to prevent drop of temperature of the end portions in the longitudinal direction of the film 51. Further according to the present embodiment, in a case where a long sheet interval occurs during a period in which power is supplied to the heating element 54*b*3 and the accumulated electric energy of the heating element 54*b*3 has not reached X multiples of the amount of supplied electric energy to the heating element 54*b*1, control is performed such that the shortage of accumulated electric energy is compensated in the subsequent set.

Control Sequence of Power Supply to Heating Element

Figure 12:
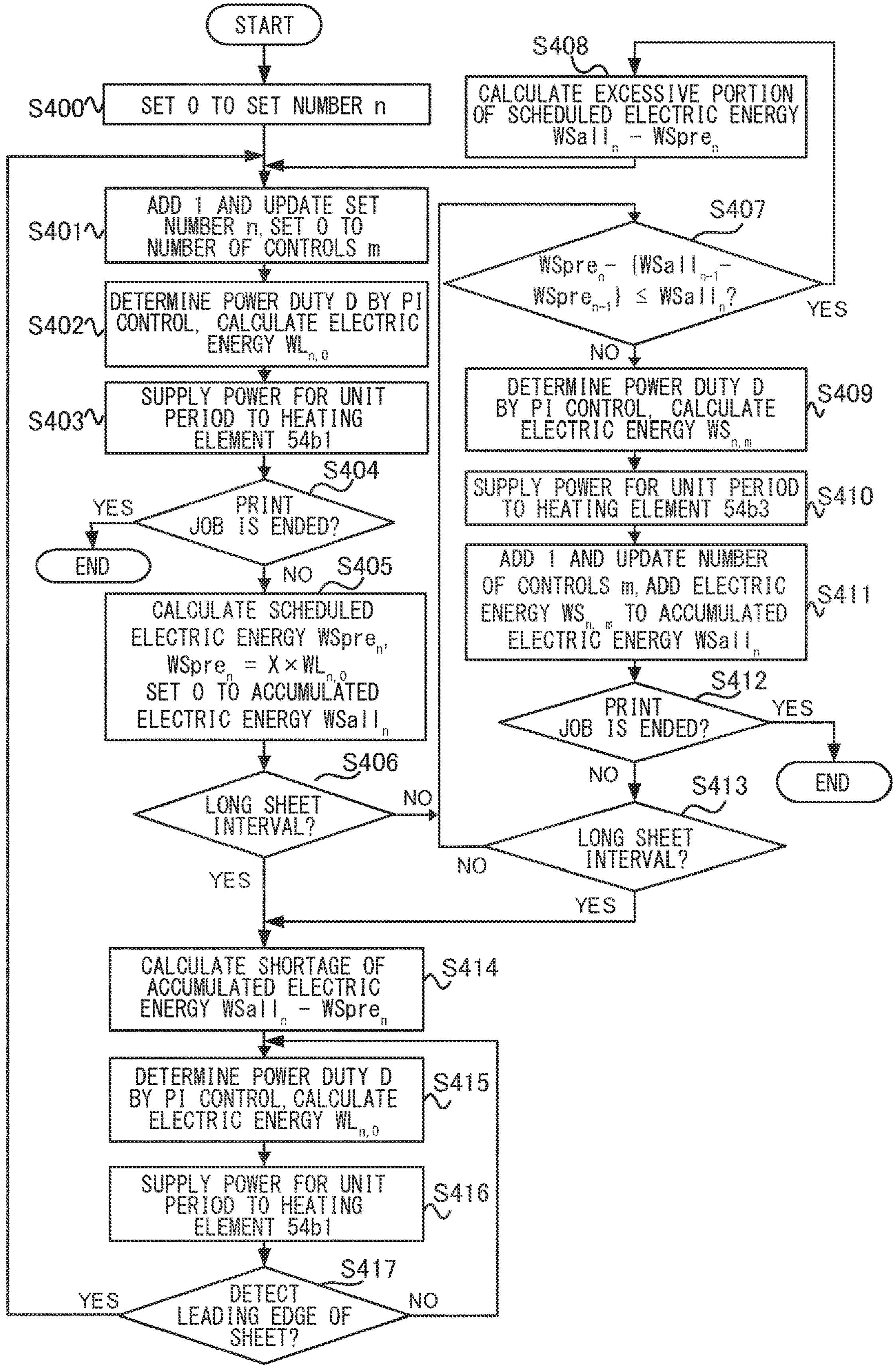
FIG. 12 is a flowchart illustrating a power supply control sequence of a heating element according to the fourth embodiment.

FIG. 12 is a flowchart having added a processing of a case where the sheet interval is long to the flowchart illustrating the control sequence of performing power supply to the heating elements 54*b*1 and 54*b*3 when executing a print job of printing on A5-size sheets P according to the third embodiment illustrated in FIG. 11.

In FIG. 12, the processing of S400 to S405 and the processing of S300 to S305 of the third embodiment illustrated in FIG. 11 are similar, so the descriptions thereof are omitted. In S406, the CPU 94 determines whether the sheet interval is longer than a predetermined time (long sheet interval?), wherein if it is determined that the sheet interval is longer than a predetermined time (i.e., determined as long sheet interval), the processing is advanced to S414, and if it is determined that the sheet interval is within the predetermined time, the processing is advanced to S407. The processing of S407 to S411 and the processing of S306 to S310 of the third embodiment illustrated in FIG. 11 are similar, so the descriptions thereof are omitted.

In S412, the CPU 94 determines whether the print job has ended, wherein if it is determined that the print job is not ended, the processing is advanced to S413, and if it is determined that the print job is ended, the processing is ended. In S413, the CPU 94 determines whether the sheet interval is longer than a predetermined time (long sheet interval?), wherein if it is determined that the sheet interval is longer than the predetermined time, the processing is advanced to S414, and if it is determined that the sheet interval is within the predetermined time, the processing is returned to S407.

In S414, the CPU 94 calculates the shortage of accumulated electric energy scheduled to be supplied to the heating element 54*b*3 during the current set n based on $WSall_n - WSpre_n$, and stores the result in the memory 95. The result of expression ($WSall_n - WSpre_n$) is a negative value. Further, in the processing of S406, if it is determined that the sheet interval is longer than the predetermined time, i.e., long sheet interval, the value of $WSall_n$ is 0, and the shortage of accumulated electric energy calculated by expression ($WSall_n - WSpre_n$) will be the same value as the value of $WSpre_n$.

In S415, the CPU 94 determines the power duty D by PI control calculating the values of the proportional term P and the integral term I of the heating element 54*b*1 based on the difference ΔT between the temperature of the heater 54 detected by the thermistor 59*a* and the target temperature. Then, the CPU 94 calculates the electric energy $WL_{n,0}$ per unit length of the heating element 54*b*1. In S416, the CPU 94 switches the power supply destination to the heating element 54*b*1, selects the power supply pattern corresponding to the power duty D calculated in S415 from the memory 95, and performs power supply for a predetermined unit cycle period, which according to the present embodiment is a two half-wave period. In S417, the CPU 94 determines whether a leading edge of the sheet P fed from the cassette 16 has been detected, wherein if it is determined that the leading edge of the sheet P has been detected, the processing is returned to S401, and if it is determined that the leading edge of the sheet P has not been detected, the processing is returned to S415.

The processing illustrated in FIG. 12 differs from the third embodiment in the added processing of a case where the sheet interval is long. As described above, regardless of which of the heating elements 54*b*1 and 54*b*3 is being supplied power, in a case where a long sheet interval occurs, the CPU 94 switches the power supply destination to and controls the heating element 54*b*1 having a wide longitudinal length, i.e., width. The control performed by the CPU 94 in such a case is started from S414. At first, if a long sheet interval occurs, the CPU 94 calculates a difference between the scheduled electric energy of the heating element **54*b*3 and the electric energy actually supplied thereto ($WSall_n$–$WSpre_n$). When transiting to the processing of S414 directly from the control performed to the heating element 54*b*1, the difference will be $WSall_n$, since $WSpre_n$=0. Thereafter, control is performed to supply power only to the heating element 54*b*1 until the leading edge of the subsequent sheet P reaches the fixing nip portion N. By performing such control, the temperature of the end portions in the longitudinal direction of the film 51 can be prevented from dropping. Then, when the CPU 94 detects that the leading edge of the subsequent sheet P has reached the fixing nip portion N, the CPU 94** starts a new set n.

As described, according to the present embodiment, temperature control of the fixing unit can be performed with high accuracy so as not to cause any temperature rise in the non-sheet passing portion.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-053218, filed on Mar. 26, 2021, which is hereby incorporated by reference herein in its entirety.

What is claimed is:

1. A fixing unit configured to perform a fixing process to fix a toner image formed on a recording material to the recording material, the fixing unit comprising:

a tubular film;

a heater disposed in an interior space of the film, the heater including a first heating element and a second heating element whose length in a longitudinal direction of the film is shorter than a length of the first heating element in the longitudinal direction;

a pressure roller configured to form a nip portion with the film;

a temperature sensor configured to detect a temperature of the heater; and a controller configured to cause the fixing unit to perform the fixing process by using the first heating element in a case where a length of the recording material in the longitudinal direction is a first length, and to perform the fixing process by switching a heating element to be used between the first heating element and the second heating element in a case where the length of the recording material in the longitudinal direction is a second length shorter than the first length, wherein in the fixing process for the recording material having the second length, the controller is configured to execute following steps (i) to (iv) of (i) causing the first heating element to be supplied with electric power for a predetermined period at a power duty that is calculated based on a difference between a target temperature of the heater and a detected temperature detected by the temperature sensor, (ii) switching a power supply destination, which is a heating element to be supplied with the electric power, to the second heating element after the predetermined period has elapsed, (iii) causing the second heating element to be supplied with the electric power at a power duty that is calculated based on a difference between the target temperature of the heater and a detected temperature detected by the temperature sensor, and (iv) switching the power supply destination to the first heating element based on a ratio of (a) a first amount of electric energy supplied to the second heating element per unit length of the second heating element during a total period since the power supply destination is switched to the second heating element to (b) a second amount of electric energy supplied to the first heating element per unit length of the first heating element during the predetermined period.

2. The fixing unit according to claim 1, wherein the controller is configured to switch the power supply destination to the first heating element if the first amount of electric energy becomes equal to or greater than an amount at which the ratio of the first amount of electric energy to the second amount of electric energy is a predetermined ratio.

3. The fixing unit according to claim 1, wherein the controller is configured to calculate the power duty such that the calculated power duty increases as a product of a resistance value per unit length of a heating element to be supplied with the electric power and a length in the longitudinal direction of the heating element to be supplied with the electric power increases.

4. The fixing unit according to claim 1, wherein in a case where R1, R2, L1, L2, D1, and D2 respectively represent a resistance value of the first heating element, a resistance value of the second heating element, the length of the first heating element in the longitudinal direction, the length of the second heating element in the longitudinal direction, the power duty at which the electric power is supplied to the first heating element, and the power duty at which the electric power is supplied to the second heating element, a following relationship is satisfied, $0.7<(D1/(R1\times L1))/(D2/(R2\times L2))<1.3$.

5. The fixing unit according to claim 1, wherein the controller is configured to calculate the first amount of electric energy based on a voltage of an AC power supply, a resistance value of the second heating element, the length of the second heating element in the longitudinal direction, and the power duty at which the electric power is supplied to the second heating element, and calculate the second amount of electric energy based on the voltage of the AC power supply from which the electric power is supplied, a resistance value of the first heating element, the length of the first heating element in the longitudinal direction, and the power duty at which the electric power is supplied to the first heating element.

6. The fixing unit according to claim 1, further comprising:

a switch configured to connect and disconnect power supply paths through which the first heating element and the second heating element are supplied with electric power, wherein the controller is configured to switch the power supply destination by causing the switch to connect and disconnect the power supply paths.

7. The fixing unit according to claim 6, wherein the switch includes a bidirectional thyristor.

8. An image forming apparatus comprising:

an image forming portion configured to form an image on a recording material;

a sheet feeder configured to feed the recording material to the image forming portion; and the fixing unit according to claim 1.

* * * * *